(12) United States Patent
Wallentin et al.

(10) Patent No.: US 6,230,013 B1
(45) Date of Patent: May 8, 2001

(54) DIVERSITY HANDLING MOVEOVER FOR CDMA MOBILE TELECOMMUNICATIONS

(75) Inventors: Bo Stefan Pontus Wallentin, Ljungsbro; Per Hans Åke Willars, Stockholm; Peter Carl Birger Lundh, Skärholmen, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/980,013

(22) Filed: Nov. 26, 1997

(51) Int. Cl.[7] .................................................. H04Q 7/20
(52) U.S. Cl. ......................... 455/436; 455/445; 455/560; 370/331
(58) Field of Search .................................. 455/411, 450, 455/524, 11.1, 422, 502, 436–444; 370/370, 331, 335–337

(56) References Cited

U.S. PATENT DOCUMENTS

| | | |
|---|---|---|
| 5,303,289 | 4/1994 | Quinn . |
| 5,483,668 | 1/1996 | Malkamaki et al. . |
| 5,566,181 * | 10/1996 | Huang et al. ........................ 370/312 |
| 5,584,049 * | 12/1996 | Weaver, Jr. et al. ................ 455/67.1 |
| 5,586,119 | 12/1996 | Scribano et al. . |
| 5,598,459 * | 1/1997 | Haartsen ............................ 455/411 |
| 5,722,074 * | 2/1998 | Muszynski ......................... 455/442 |
| 5,850,607 * | 12/1998 | Muszynski ......................... 445/442 |

FOREIGN PATENT DOCUMENTS

| | | |
|---|---|---|
| WO 95/08898 | 3/1995 | (WO) . |
| WO 95/08998 | 3/1995 | (WO) . |
| WO 95/15665 | 6/1995 | (WO) . |
| WO 95/20865 | 8/1995 | (WO) . |

OTHER PUBLICATIONS

Cheung, et al., "Network Configurations for Seamless Support of CDMA Soft Handoffs Between Cell Clusters", IEEE Journal on Selected Areas in Communications, vol. 15, No. 7, Sep. 1997, pp. 1276–1288.
Cheung, et al, "Network Configurations for Seamless Support of CDMA Soft Handoffs Between Cell–Clusters", Dept. of Electrical Engineering, The University of British Columbia, 0–7803–3300–4/96 ©1996, pp. 295–299.
"Digital Cellular Telecommunications System (Phase 2+); Mobile Application Part (MAP) Specification (GSM 09.02 version 5.8.0)", European Telecommunications Standard Institute; Draft pr ETS 300 974, Feb. 1998.
"Cellular Radiotelecommunications Intersystem Operations", ANSI–41–D (Former (TIA/EIA IS–41–C), pp. 2–5–2–14, 2–25–2–30.
Jones, et al., IS–634 revision A (PN–3539) 2nd Ballot Version—Draft V&V, Oct. 27, 1997, pp. 1–4, 10–16 and 18.
Jones, et al., IS–634 revision A—part 3 (IS–643.3 rev A) (PN–3539) 2nd Ballot Version—Draft V&V, Oct. 27, 1997, pp. 56–60 and 70–71.

* cited by examiner

*Primary Examiner*—Dwayne Bost
*Assistant Examiner*—Charles Craver
(74) *Attorney, Agent, or Firm*—Nixon & Vanderhye P.C.

(57) ABSTRACT

In connection with a diversity handling moveover procedure for a cellular system having soft handover, allocation of a replacement diversity handling unit in a target node occurs only after a moveover decision has been made by a source node. Initially, an original or source diversity handling unit at the source node performs connection combining and connection splitting functions for legs of a mobile connection routed through plural base stations serving a mobile station. In accordance with movement of the mobile station, the source node makes the movement decision. The moveover decision can be based on factors such as base station utilization and/or actual and/or predicted directional movement of the mobile station. In some embodiments, the diversity handling moveover procedure involves selection among plural nodes for situs of the replacement or target diversity handling unit.

23 Claims, 20 Drawing Sheets

DIVERSITY HANDLING MOVEOVER FOR CDMA MOBILE TELECOMMUNICATIONS

This patent application is related to U.S. Pat. Application Ser. No. 08/979,866 filed simultaneously, entitled "Multi-stage Diversity Handling For CDMA Mobile Telecommunications", which is incorporated herein by reference.

BACKGROUND

1. Field of the Invention

The present invention pertains to telecommunications, and particularly to any cellular/mobile telecommunications using diversity (soft) handover, such as occurs in spread spectrum or code division multiple access (CDMA) technology.

2. Related Art and Other Considerations

In mobile telecommunications, a mobile station such as mobile telephone communicates over radio channels with base stations. Typically a plurality of base stations are, in turn, ultimately connected to a mobile switching center. The mobile switching center is usually connected, e.g., via a gateway, to other telecommunication networks, such as the public switched telephone network.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., Applications of CDMA in Wireless/Personal Communications, Prentice Hall (1997).

In addition, in CDMA mobile communications, typically the same baseband signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels from multiple base stations by a mobile station in a CDMA scheme is termed "soft handover."

FIG. 1 shows a radio access network (RAN) 20 which comprises radio network controllers (RNC) $22_1$ and $22_2$ respectively connected to mobile switching centers (MSC) $24_1$ and $24_2$. Radio network controller (RNC) $22_1$ is connected to base stations (BS) $26_{1,1}$, $26_{1,2}$, and $26_{1,3}$; radio network controller (RNC) $22_2$ is connected to base stations (BS) $26_{2,1}$, $26_{2,2}$, and $26_{2,3}$. At the moment shown in FIG. 1, and for reasons summarized above, mobile station MS is shown in FIG. 1 as having radio communication with two base stations, particularly base stations $26_{1,2}$ and $26_{1,3}$. The lines $28_{1,2}$ and $28_{1,3}$ each represent a communication path. Specifically, line $28_{1,2}$ depicts both the radio channel from mobile station MS to base station BS $26_{1,2}$ and the land line link channel from base station BS $26_{1,2}$ to radio network controller (RNC) $22_1$; line $28_{1,3}$ depicts both the radio channel from mobile station MS to base station BS $26_{1,3}$ and the land line link channel from base station BS $26_{1,2}$ to radio network controller (RNC) $22_1$. In the case of both lines $28_{1,2}$ and $28_{1,3,}$ the land line link is connected to a diversity handover unit (DHU) $30_1$ of radio network controller (RNC) $22_1$.

Thus, as depicted with reference to FIG. 1, the mobile connection with mobile station MS potentially utilizes several "legs", each leg being represented by the lines $28_{1,2}$ and $28_{1,3}$ in the case of mobile station MS of FIG. 1. As the overall connection between mobile station MS and any other party is viewed, the diversity handover unit (DHU) $30_1$ serves essentially both to combine and split the different legs utilized by a mobile station. The splitting occurs in the sense that information directed toward the mobile station is directed along the plural parallel legs to differing base stations. Information received from a base station may actually be obtained through several of the legs (e.g., from several base stations), in which sense the diversity handover unit (DHU) $30_1$ serves a combining function.

FIG. 1 illustrates the simple case in which the different legs of the connection, represented by lines $28_{1,2}$ and $28_{1,3}$, are for base stations BS all of which are connected to radio network controller (RNC) $22_1$. However, should the mobile station MS roam sufficiently to pick up signals from another base station controlled by another RNC, e.g., into or proximate a cell handled by base station BS $26_{2,1}$, for example, a more complex situation occurs as shown in FIG. 1A.

In the situation depicted in FIG. 1A, the mobile connection involving mobile station MS employs base stations belonging to differing radio network controllers (RNC). Such situation involves a different type of handover—an inter-RNC soft handover. Inter-RNC soft-handovers are made between two or several RNCs. In the particular situation shown in FIG. 1A, an inter-RNC soft handover is made between radio network controller (RNC) $22_1$, which is also known as the "Source" RNC, and radio network controllers (RNC) $22_2$, which is also known as the "Target" RNC. Radio network controller (RNC) $22_2$ is the Source RNC since it has current control of the mobile radio connection. The Target RNC is an RNC, other than the Source RNC, that has, or has been decided to have, base stations utilized by the mobile radio connection.

To facilitate, e.g., inter-RNC soft-handovers, the radio network controllers (RNC) $22_2$ and $22_2$ are connected by an inter-RNC transport link 32. Inter-RNC transport link 32 is utilized for the transport of control and data signals between Source RNC $22_1$ and Target RNC $22_2$, and can be either a direct link or a logical link as described, for example, in International Application Number PCT/U.S. Ser. No. 94/12419 (International Publication Number WO 95/15665).

Thus, in FIG. 1A, the mobile station MS communicates not only through the leg represented by line $28_{1,3}$, but now also by the leg represented by line $28_{2,1}$. The leg represented by line $28_{2,1}$ includes the radio link between mobile station MS and base station BS $26_{2,1}$, as well as the information pertinent to the mobile connection which is carried over inter-RNC transport link 32.

As mobile station MS continues to move, it may eventually occur that all of the base stations utilized by the mobile station are served by the Target RNC $22_2$, as is pictured in FIG. 11B. In such case, inter-RNC transport link 32 must carry both legs of the mobile connection, represented by lines $28_{2,1}$ and $28_{2,2,}$ respectively. Carrying multiple legs of the same mobile connection undesirably demands further resources from inter-RNC transport link 32. In FIG. 1B, diversity handover unit $30_1$ handles all combining and splitting operations, even though no base station owned by Source RNC $22_2$ is employed by the mobile connection with mobile station MS.

For the situation shown in FIG. 1B, resources of inter-RNC transport link 32 can be preserved if the diversity handling operations are moved to Target RNC $22_2$. Utilization of inter-RNC transport link 32 would be reduced in that, for example, multiple packets destined in parallel for base stations BS $26_{1,2}$ and $26_{2,2}$ need not be carried on link 32, but rather a diversity handover unit at Target RNC $22_2$ could instead perform the splitting. A similar economy results in having a diversity handover unit at Target RNC $22_2$ combining the signals from mobile station MS as received via the base stations BS $26_{2,1}$ and $26_{2,2}$, and forwarding a resultant signal to Source RNC $22_1$.

The movement of diversity handling operations (diversity handling "moveover") to a Target RNC, such as Target RNC $22_2$ of FIG. 1B, is a complex endeavor, and can potentially result in an interruption of the established mobile connection. The prior art approach to moving diversity handling operations is shown in International Application Number PCT/U.S. Ser. No. 94/12419 (International Publication Number WO 95/15665). That approach, illustrated in FIG. 1C, involves a two step process. The first step of the process is routing the mobile connection, in a bypass mode, through a diversity handling unit (DHU) $30_2$ in the Target RNC $22_2$ upon first utilization by mobile station MS of the Target RNC (e.g., when a base station served by Target RNC is first invoked). In its bypass mode, diversity handling unit (DHU) $30_2$ in the Target RNC $22_2$ performs no combining or splitting operations. Rather, all combining and splitting operations remain the province of diversity handling unit (DHU) $30_1$ in Source RNC $22_2$.

Only later, when (and if) all base stations utilized by mobile station are owned by the Target RNC $22_2$, is the second step of the above-described approach implemented. In the second step, the combining and splitting functions are moved from diversity handover unit (DHU) $30_1$ of Source RNC $22_2$ to diversity handover unit (DHU) $30_2$ of Target RNC $22_2$, and diversity handover unit (DHU) $30_1$ is bypassed as shown in FIG. 1C.

Prior art techniques of diversity handling moveover are problematic for several reasons. For example, at the time shown in FIG. 1B prior to actual transfer of combining/splitting operations to Target RNC $22_2$, two transport connections (e.g., two legs of traffic for a single connection) are still wastefully used on inter-RNC transport link 32. Moreover, for each RNC that is used by the mobile radio connection, one diversity handover unit (DHU) 30 is necessary. The use of two diversity handover units (s) is a further waste of hardware.

What is needed therefore, and an object of the invention, is an efficient and economical diversity handling moveover technique.

SUMMARY OF THE INVENTION

In connection with a diversity handling moveover procedure, allocation of a replacement diversity handling unit in a target node occurs only after a moveover decision has been made by a source node. Initially, an original or source diversity handling unit at the source node performs connection combining and connection splitting functions for legs of a mobile connection routed through plural base stations serving a mobile station. In accordance with movement of the mobile station, the source node makes a decision to move the connection combining and connection splitting functions to the target node. The moveover decision can be based on factors such as base station utilization and/or actual and/or predicted directional movement of the mobile station, as well as transmission costs. In some embodiments, the diversity handling moveover procedure involves selection among plural nodes for situs of the replacement or target diversity handling unit.

In one mode of the invention, an anchor node performs the actual switchover which causes moveover of the diversity handoff unit. In addition, a change of mobile switching center (MSC) can be implemented.

The present invention optimizes the transmission path between network nodes and utilization of hardware in the nodes (e.g., diversity handover units and interfaces). The moveover of the present invention is executed independently from radio interface handover, allowing separation of optimizing radio resources and fixed line transmission resources. In accordance with the present invention, the moveover decision can thus also be based on transmission utilization and delay.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
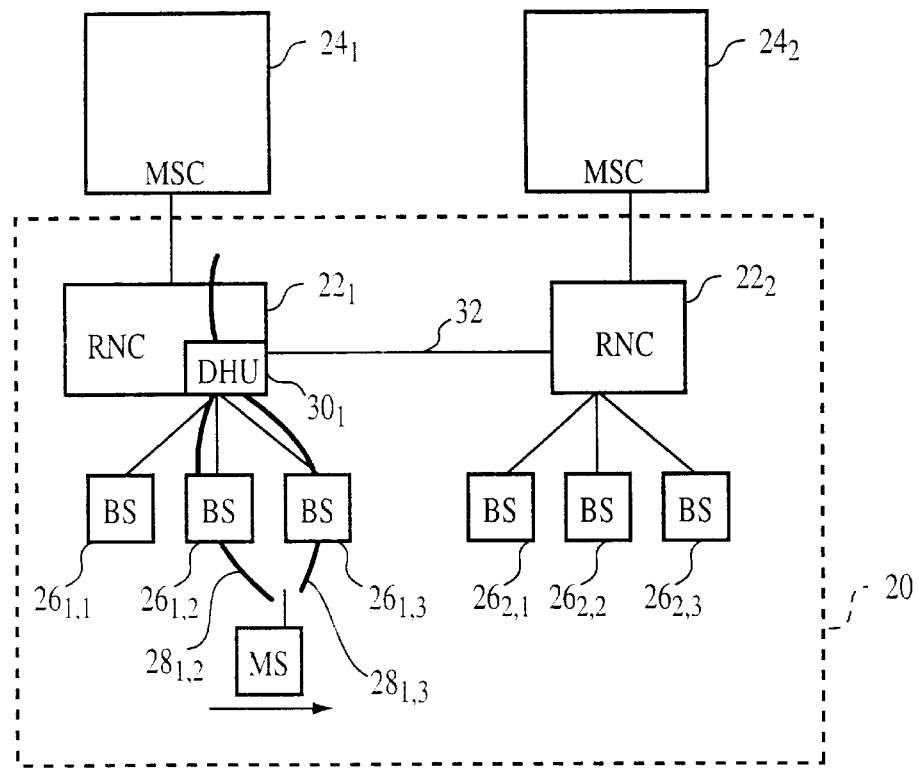
FIG. 1, FIG. 1A, FIG. 1B, and FIG. 1C are each diagrammatic views showing prior art management of a mobile connection for a mobile station moving from base stations controlled by a Source radio network controller to base stations owned by a Target radio network controller.
Figure 1A:
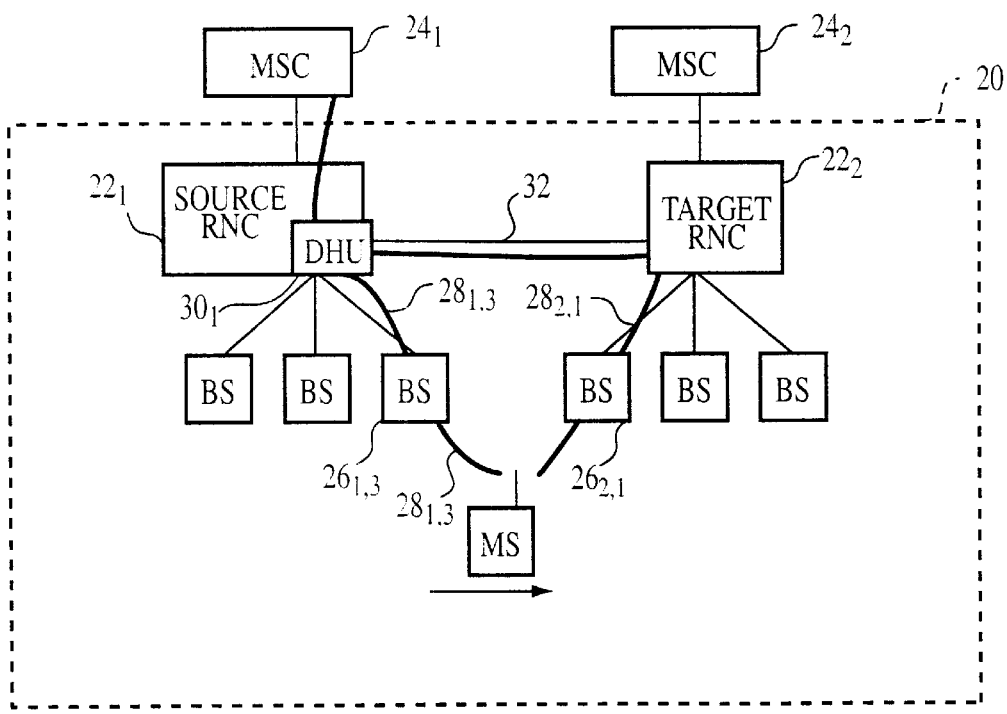
Figure 1C:
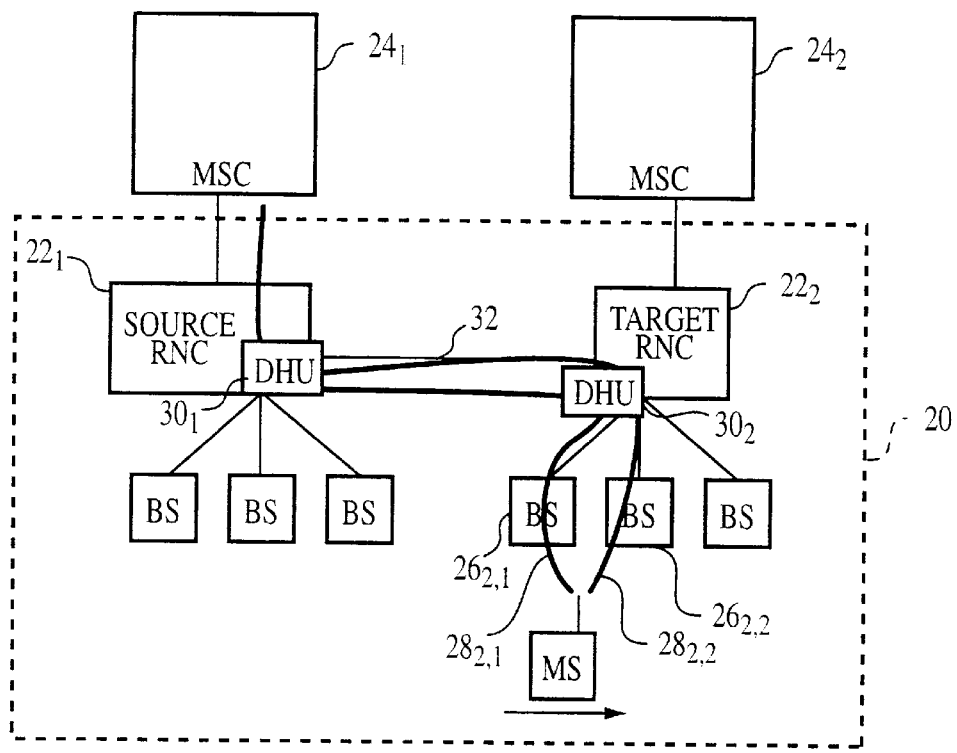
Figure 1B:
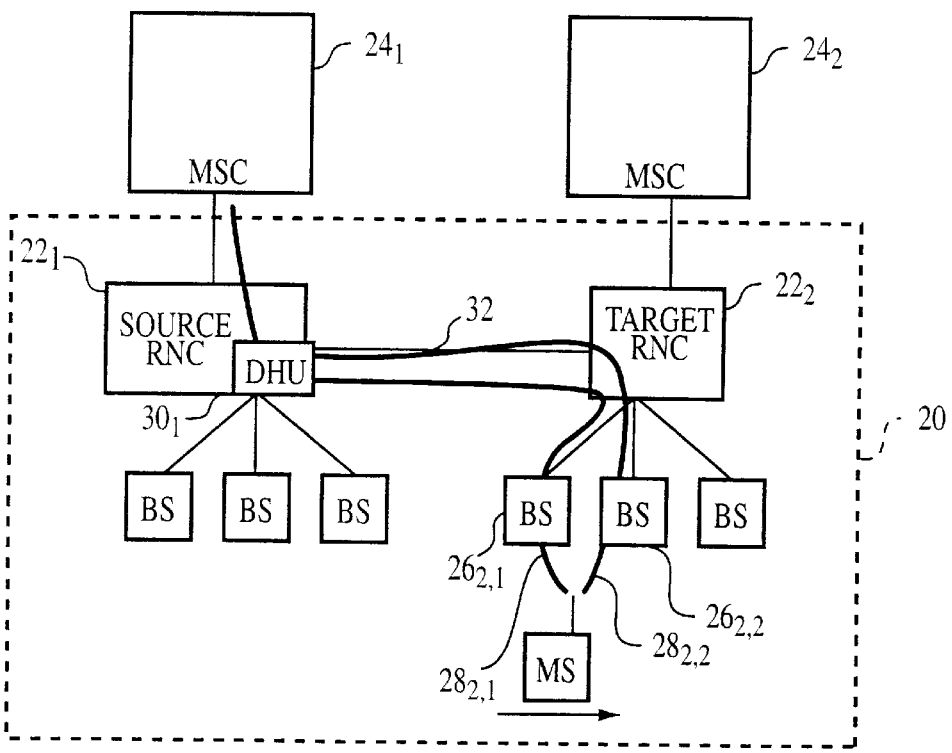
Figure 2:
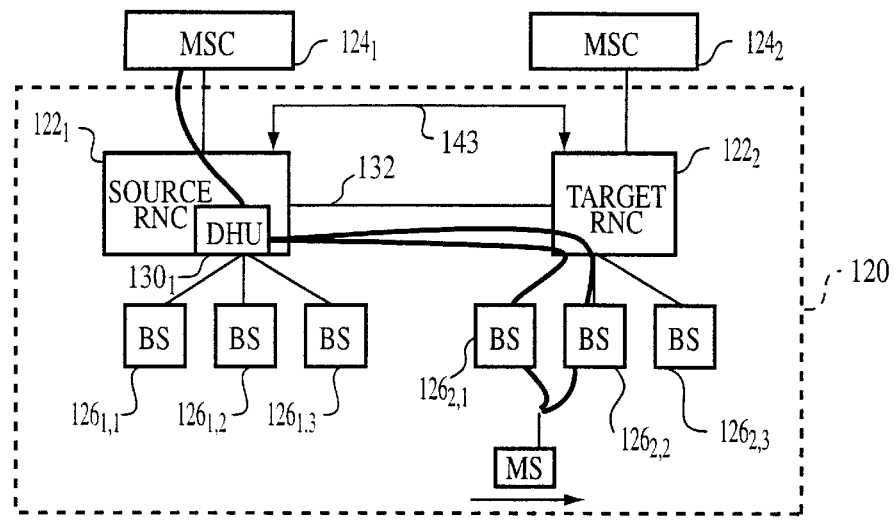
FIG. 2, FIG. 2A, and FIG. 2B are each diagrammatic views showing differing stages of management of a mobile connection according to a mode of the present invention, including a mode of a diversity handling moveover from a first radio network controller to a second radio network controller according to the present invention.

FIG. 2 shows a portion of a radio access network 120 according to one mode of the present invention which comprises a first set of base stations (BS) $126_{1,1}$, $126_{1,2}$, and $126_{1,3}$ connected by land lines to Source radio network controller (RNC) $122_1$, and a second set of base stations (BS) $126_{2,1}$, $126_{2,2}$, and $126_{2,3}$ connected by land lines to a second radio network controller (RNC) $122_2$ which serves as a Target radio network controller. Source RNC $122_1$ is connected to mobile switching center $124_1$ while Target RNC $122_2$ is connected to mobile switching center $124_2$. Source RNC $122_1$ and Target RNC $122_2$ are connected by inter-RNC transport link 132. Inter-RNC transport link 132 can be either a direct link or a logical link. In the case of a logical link, inter-RNC transport link 132 is physically connected to a transport network or a public switched telephone network (such as ISDN or PSTN). Source RNC $122_1$ and Target RNC $122_2$ are considered as control nodes of radio access network 120 in that, among other things, these RNCs control or manage the sets of base stations respectively connected thereto.

Figure 2A:
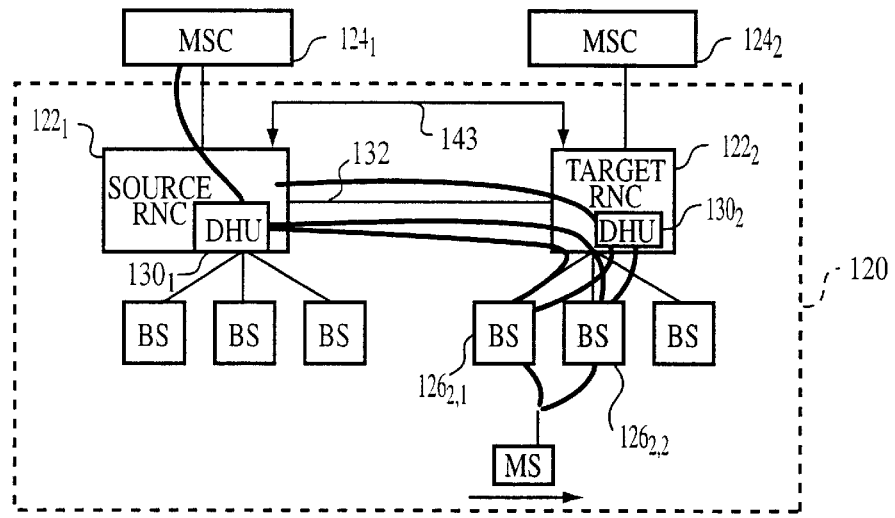
Figure 2B:
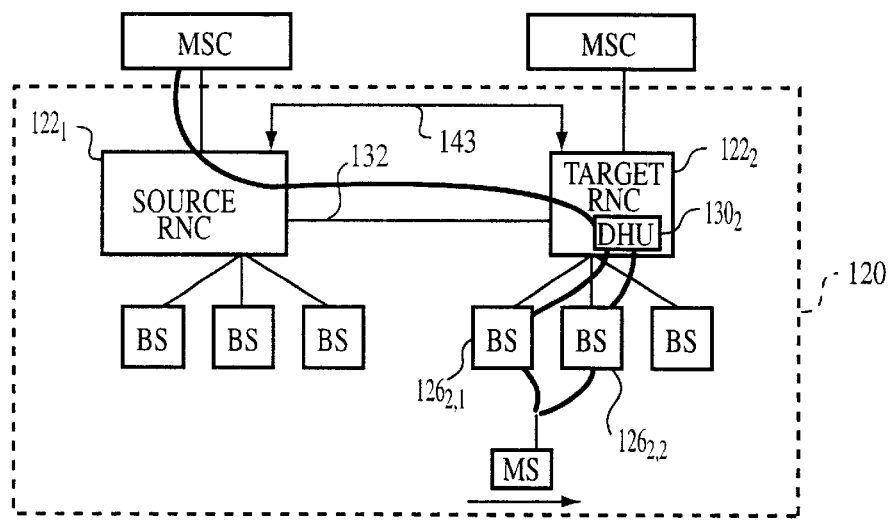

As described in more detail herein, for a mobile connection controlled by Source RNC $122_1$, in accordance with the present invention allocation of a diversity handover unit in Target RNC $122_2$ is not accomplished until Source RNC $122_1$ has made a decision to move diversity handling operations to Target RNC $122_2$. In this regard, FIG. 2 depicts radio access network 120 at a time when Source RNC $122_1$ makes a decision for diversity handling moveover; FIG. 2A shows radio network area 120 at a subsequent time during which diversity handover unit (DHU) $130_2$ is in the process of being allocated for Target RNC $122_2$; and FIG. 2B shows radio access network 120 at a yet subsequent time when diversity handling moveover has been completed and a switchover has occurred in Source RNC $122_1$.

Figure 3:
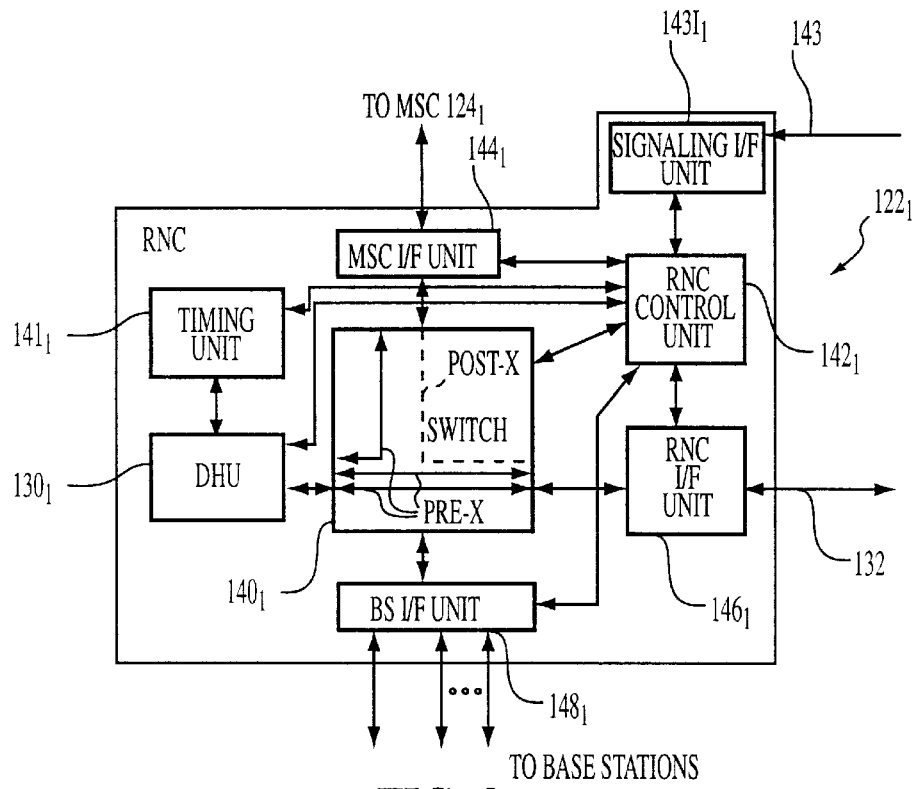
FIG. 3 is a schematic view of a Source radio network controller (RNC) according to an embodiment of the invention.

Source RNC $122_1$ is shown in more detail in FIG. 3 as comprising a switch $140_1$. Switch $140_1$, which is controlled by RNC control unit $142_1$, has a plurality of ports, some of which are connected to diversity handover unit (DHU) $130_1$ and others of which are connected to various interfaces. Diversity handover unit (DHU) $130_1$ is connected to a timing unit $141_1$. The RNC control unit $142_1$ is connected to each element of RNC $122_1$.

For reasons explained hereinafter, Source RNC $122_1$ is connected to a signaling network represented by line 143. Source RNC $122_1$ is connected to signaling network 143 via a signaling interface $143I_1$. Signaling interface $143I_1$ is connected to RNC control unit $142_1$.

The interfaces connected to ports of switch $140_1$ include MSC interface unit $144_1$; RNC interface unit $146_1$; and base station interface unit $148_1$. MSC interface unit $144_1$ is connected to mobile switching center $124_1$. RNC interface unit $146_1$ is connected to inter-RNC transport link 132. Base station interface unit $148_1$ is connected to the first set of base stations (BS) served by Source RNC $122_1$. Although base station interface unit 148, is shown logically as one unit serving all base stations, it should be understood that physically base station interface unit $148_1$ can be a separate unit for each base station.

Figure 4:
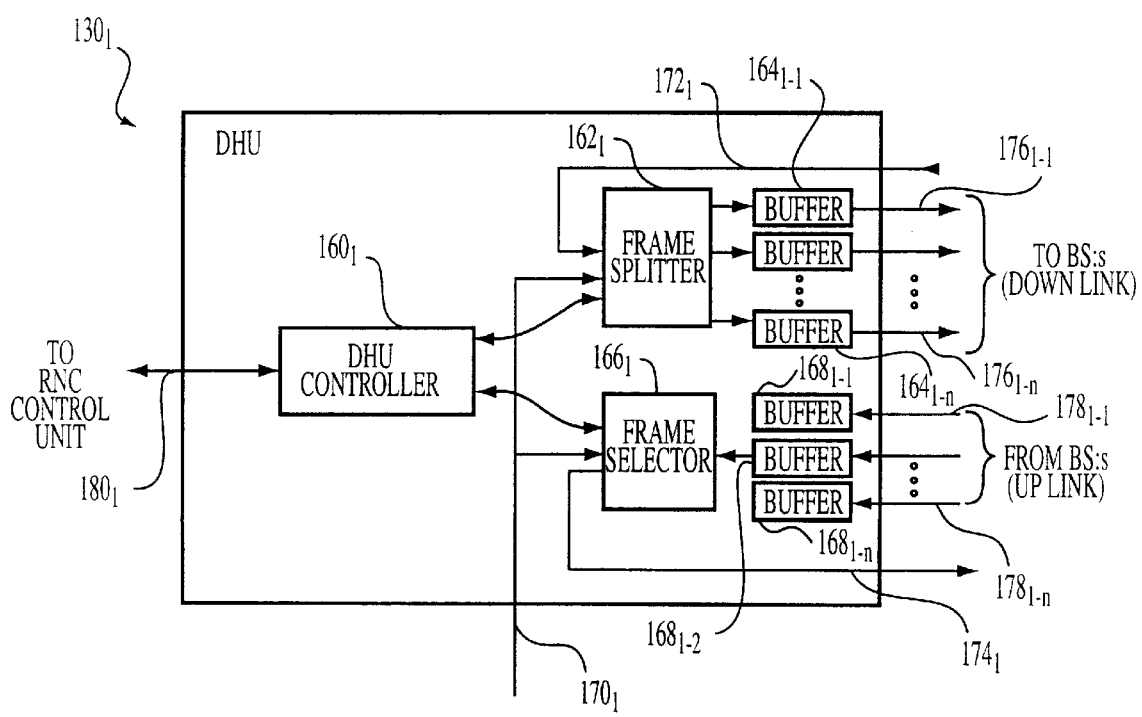
FIG. 4 is a schematic view of a diversity handover unit (DHU) included in the Source radio network controller (RNC) of FIG. 3.

Diversity handover unit (DHU) $130_1$ of Source RNC $122_1$ is shown in more detail in FIG. 4. In particular, diversity handover unit (DHU) $130_1$ primarily comprises controller $160_1$; frame splitter $162_1$; a set of downlink buffers $164_{1-1}$–$164_{1-n}$; a frame selector $166_1$; and a set of uplink buffers $168_{1-1}$–$168_{1-n}$. Both frame splitter $162_1$ and frame selector $166_1$ receive timing signals on line $170_1$ from timing unit $141_1$, and are also connected to controller $160_1$.

Frame splitter $162_1$ receives (via switch $140_1$) input in the form of frames on line $172_1$ from mobile switching center $124_1$, while frame selector sends output in the form of frames on line $174_1$ to mobile switching center $124_1$. Lines $172_1$ and $174_1$ are connected to particular ports of switch $140_1$ which are internally connectable through switch $140_1$ to mobile switching center $124_1$.

Frame splitter $162_1$ outputs frames received from mobile switching center $124_1$ on line $172_1$ to each of one of the buffers in set 164 which correspond to a base station currently involved in the mobile connection for the mobile station. Each of the buffers in set 164 is in turn connected to transmit the frames it receives to switch $140_1$ over lines $176_1$–$176_{1-n}$. Lines $176_{1-1}$–$176_{1-n}$ are connected to respective input ports of switch $140_1$, which input ports are internally cross connectable (e.g., switchable) through switch $140_1$ to the downlink land lines for the respective base stations BS participating in the mobile connection.

Frame selector $166_1$ receives frames from various ones of the buffers in the set of up-link buffers $168_1$–$168_n$. Base stations (BS) participating in a mobile connection send frames to their corresponding up-link buffers $168_1$–$168_n$ on corresponding ones of lines $178_{1-1}$–$178_{1-n}$. Each of lines $178_{1-1}$–$178_{1-n}$ is connected to corresponding ports of switch $140_1$, with those ports being internally switchable internally through switch $140_1$ to up-link land lines from the corresponding base stations (BS). Thus, when plural base stations are involved in a mobile connection, for plural frames representing the same up-linked information (e.g., frames having the same frame number) frame selector $166_1$ picks the best frames for transmission (via switch $140_1$) to mobile switching center $124_1$.

As indicated above, controller $160_1$ of diversity handover unit (DHU) $130_1$ is connected to frame splitter $162_1$ and frame selector $166_1$, for controlling operations thereof, as well as by line $180_1$ to RNC control unit $142_1$. RNC control unit $142_1$ supervises operation of controller $160_1$ and coordinates operations of controller $160_1$ with other elements of Source RNC $122_1$.

Figure 5:
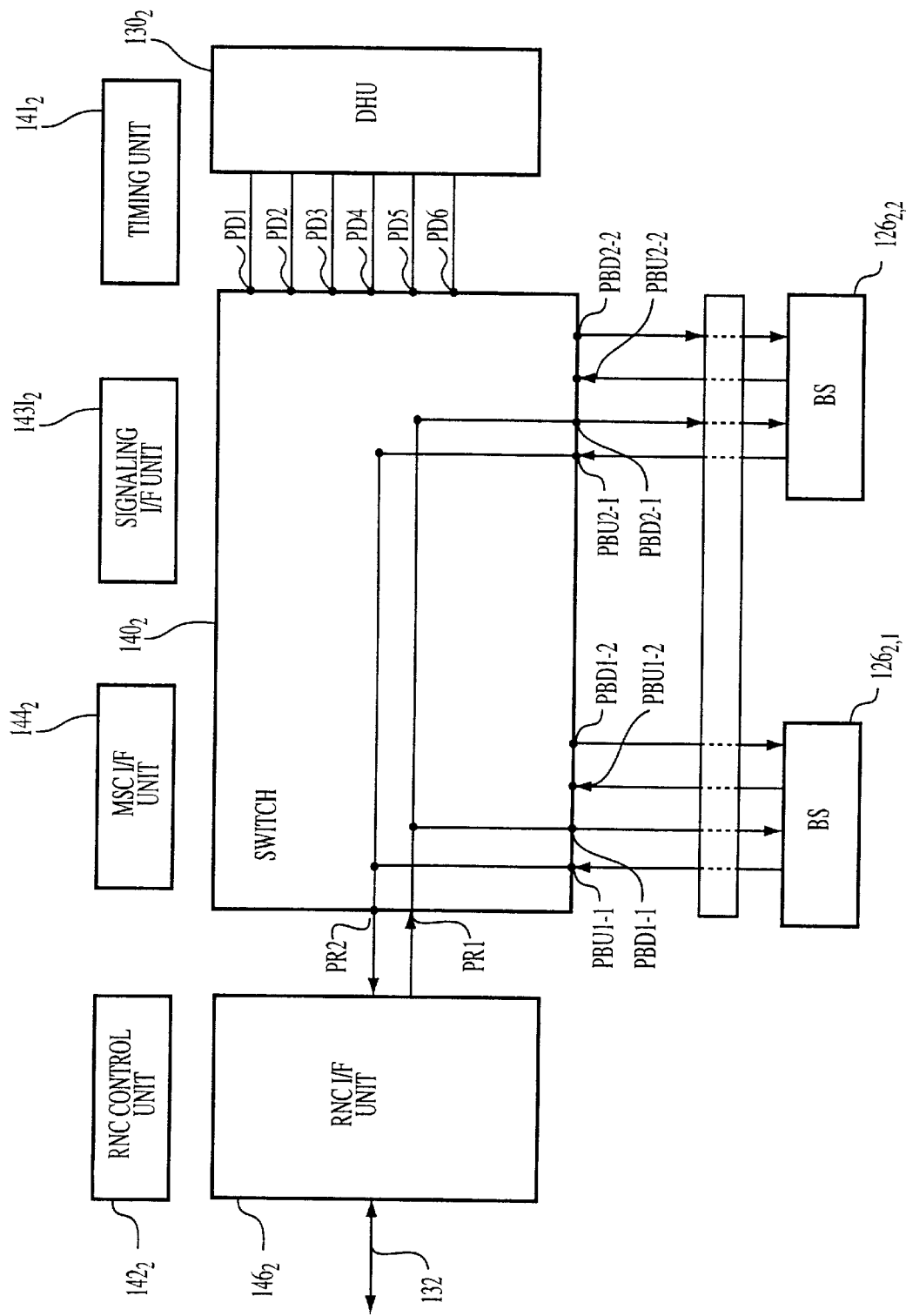
FIG. 5, FIG. 5A, and FIG. 5B are schematic views of a Source radio network controller (RNC) according to an embodiment of the invention at points in time corresponding to FIG. 2, FIG. 2A, and FIG. 2B, respectively.

FIG. 5 shows Target RNC $122_2$, according to an example embodiment of the invention, at a particular instance in time corresponding to the time of FIG. 2. Target RNC $122_2$ includes switch $140_2$; timing unit $141_2$; RNC control unit $142_2$; base station interface unit (BS I/F unit) $148_2$; MSC interface unit $144_2$; and diversity handover unit (DHU) $130_2$. For simplicity, some connections within Target RNC $122_2$ are not shown, such as connections of all elements both to timing unit $141_2$ and RNC control unit $142_2$.

At the time shown in FIG. 5, mobile station MS has just moved to a geographical location at which it is in radio communication with base stations (BS) $126_{2,1}$ and $126_{2,2}$, but no longer in radio communication with any base station owned by Source RNC $122_1$ (see FIG. 2). At the time shown in FIG. 5, no diversity handover unit (DHU) in Target RNC $122_2$ has been allocated to the mobile connection for mobile MS. Rather, the legs of the connection are all routed through switch $140_2$ without being routed through diversity handover unit (DHU) $130_2$.

In the above regard, as shown in FIG. 5, switch $140_2$ has, among its many other ports, base station downlink ports PBD 1-1, PBD 1-2, PBD2-1 and PBD2-2; base station uplink ports PBU1-1, PBU1-2, and PBU2-2; ports PR1 and PR2 connected to downlink and uplink terminals respectively of RNC I/F unit $146_2$; and diversity handover unit ports PD1–PD6. As shown in FIG. 5, base station uplink ports PBU1-1 and PBU1-2 and base station downlink ports PBD1-1 and PBD1-2 are connected through base station I/F unit $148_2$ to base station (BS) $126_{2,1}$; while base station uplink ports PBU2-1 and PBU2-2 and base station downlink ports PBD2-1 and PBD2-2 are connected through base station I/F unit $148_2$ to base station (BS) $126_{2,2}$. At the time shown in FIG. 5, base station uplink ports PBU1 and PBU2 are connected (via switch $140_2$) to interface uplink port PR1; base station downlink ports PBD 1 and PBD2 are connected (via switch $140_2$) to interface downlink port PR2.

Figure 6:
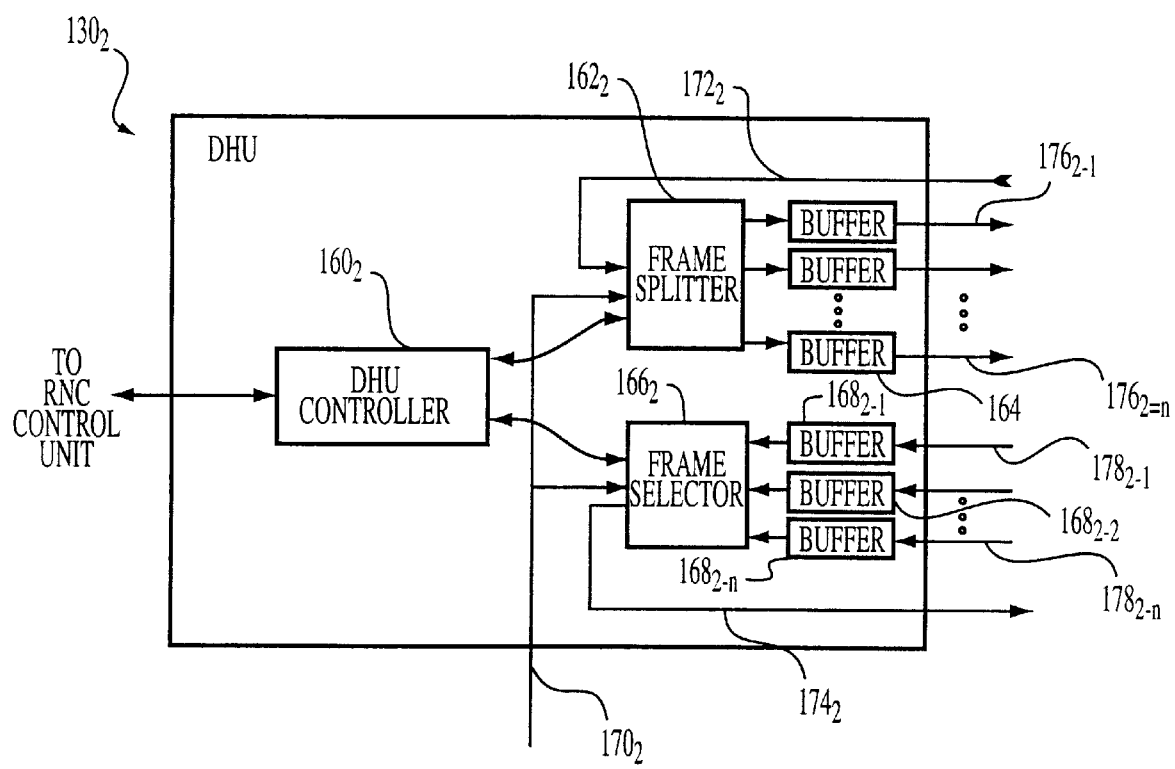
FIG. 6 is a schematic view of a diversity handover unit (DHU) included in the Target radio network controller (RNC) of FIG. 5.

Diversity handover unit (DHU) $130_2$ of Target RNC $122_2$ shown in FIG. 6, is understood to have essentially the same structure as does diversity handover unit (DHU) $130_1$ of FIG. 4, with one primary exception. That exception is that, in diversity handover unit (DHU) $130_2$, lines $172_2$ and $174_2$ will ultimately connected by switch $140_2$ to RNC I/F unit $146_2$ rather than to a mobile switching center. Specifically, as explained hereinafter, lines $172_2$ and $174_2$ are connectable by switch $140_2$ to switch ports PR1 and PR2 for respective application to downlink and uplink terminals of RNC I/F unit $146_2$ (see FIG. 5).

As mentioned above, at the time shown in FIG. 5, no diversity handover unit (DHU) in Target RNC $122_2$ has been allocated to the mobile connection for mobile MS. It should be realized that Target RNC $122_2$ likely does have other diversity handover units connected to switch $140_2$, and that those other diversity handover units are handling mobile connections other than to the particular mobile station MS shown in FIG. 5. Such other diversity handover units would accordingly have routed therethrough frames involved in other mobile connections, e.g., frames routed from MSC $124_2$ to the other mobile station and frames routed from the other mobile station (and through various base stations) to MSC $124_2$. However, for the purposes of the mobile connection to mobile MS here under discussion, at the time of FIG. 5 no diversity handover unit of Target RNC $122_2$ is yet involved.

Figure 7:
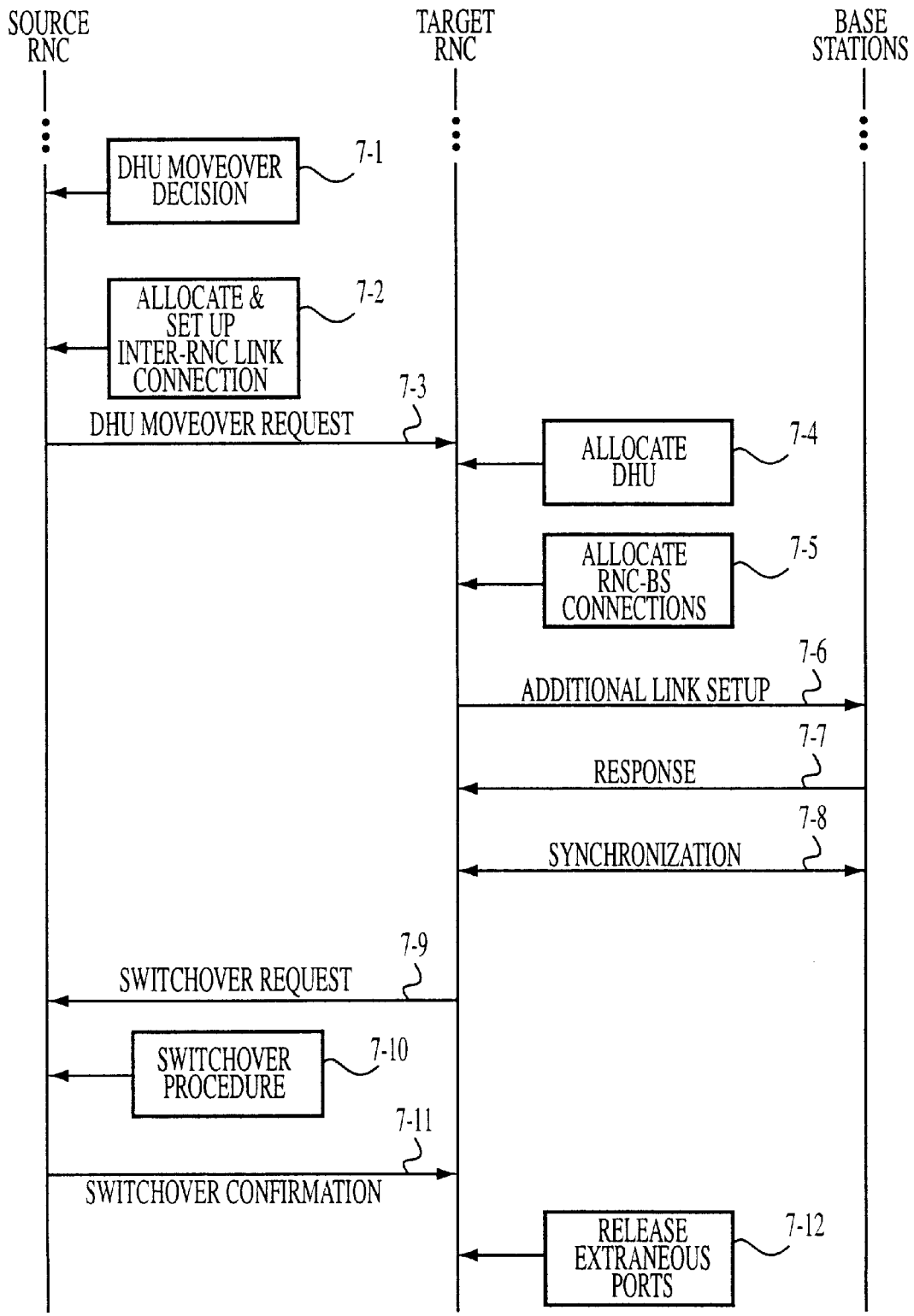
FIG. 7 is a schematic view of a sequence of operations involved in a diversity handling moveover procedure according to a mode of the invention involving two radio network control nodes.

FIG. 7 shows a sequence of operations involved in a diversity handling moveover procedure according to an embodiment of the invention. FIG. 7 shows in three separate parallel vertical lines the operations conducted by each of Source RNC $122_1$, Target RNC $122_2$, and the base stations (BS) served by Target RNC $122_2$ and involved in the mobile communication with mobile station MS.

Operation 7-1 of FIG. 7 shows RNC control unit $142_1$ of Source RNC $122_1$ making a decision that diversity handover unit moveover (e.g., diversity handling moveover) should occur. In essence, according to one mode of the invention, RNC control unit $142_1$ decides to make a diversity handling moveover when Source RNC $122_1$ no longer has any of its base stations (BS) $126_1$–$126_3$ involved in the mobile connection for mobile station MS. Logic of RNC control unit $142_1$ relating to the diversity handling moveover decision is discussed in more detail in connection with FIG. 9.

After RNC control unit $142_1$ has decided to make a diversity handling moveover, RNC control unit $142_1$ performs operation 7-2. Operation 7-2 involves RNC control unit $142_1$ allocating or setting up a connection on inter-RNC link 132. In connection with operation 7-2, RNC control unit $142_1$ allocates port of switch $140_1$ and a port of RNC interface unit $146_1$ to be used by the new connection on inter-RNC link 132 between Target RNC $122_2$ and Source RNC $122_1$. The allocation at operation 7-2 is for a new connection, i.e., a connection for mobile station MS, since connections for other mobile stations may already exist.

Upon completion of the allocation of operation 7-2, at operation 7-3 RNC control unit $142_1$ sends a signaling message including a diversity handling (DHU) moveover request to Target RNC $122_2$. Signaling messages between RNCs are transmitted over signaling network 143, and can be in accordance with signaling system no. 7, for example. Internally in Source RNC $122_1$ the diversity handover (DHU) moveover request is routed through switch $140_1$ and RNC interface unit $146_1$ for application on inter-RNC link 132. The diversity handover unit (DHU) moveover request instructs Target RNC $122_2$ to allocate a diversity handover unit (DHU) for the mobile connection for mobile station MS and to connect the allocated diversity handover unit (DHU) to the base stations currently used by mobile station MS. The signaling message which includes the diversity handover unit (DHU) moveover request carries the following information: (1) the identity of the connection on the inter-RNC link 132 to be associated with the connection between the newly allocated diversity handover unit (DHU) and the applicable MSC (e.g., MSC $124_1$); and (2) the identities of the base stations previously allocated by diversity handover unit (DHU) $140_1$ of Source RNC $122_1$ and currently in use for the mobile connection with mobile station MS.

The signaling message from Source RNC $122_1$ (which includes the diversity handover unit (DHU) moveover request) is routed through switch $140_2$ to RNC control unit $142_2$ of Target RNC $122_2$. The routing of the signaling message to RNC control unit $142_2$ may include routing through a signaling network. Upon receipt of the signaling message, RNC control unit $142_2$ performs operations 7-4, 7-5, and 7-6 as shown in FIG. 7. Performance of operations 7-4, 7-5, and 7-6 is reflected by FIG. 5A.

Operation 7-4 involves allocating a diversity handover unit, particularly diversity handover unit (DHU) $130_2$, to the connection for mobile station MS. Allocating diversity handover unit (DHU) $130_2$ to the connection for mobile station MS includes connecting, via switch $140_2$, handover unit (DHU) $130_2$ to RNC interface unit $146_2$. Such connection is accomplished by connecting port PD1 to port PR2 and connecting port PR1 to port PD2 [see FIG. 5A]. In terms of diversity handover unit (DHU) $130_2$, such connection means that line $174_2$ (connected to port PD1) is connected to port PR2, so that (upon completion of moveover) frames will be sent from frame selector $166_2$ to RNC I/F $146_2$, and ultimately via switch $140_1$ to mobile switching center MSC $124_1$ [see FIG. 6]. In addition, line $172_2$ (connected to port PD2) is connected to port PR1, so that (upon completion of moveover) frames can be sent through switch $140_1$ and switch $140_2$ to frame splitter $162_2$ [see FIG. 6].

Operation 7-5 includes allocating new connections between Target RNC $122_2$ and the base stations controlled by Target RNC $122_2$ which are serving mobile station MS, particularly base station (BS) $126_{2,1}$ and base station (BS) $126_{2,2}$. Allocating such new connections includes assigning ports PBU1-2 and PBD1-2 to the connection respecting base station (BS) $126_{2,1}$, and assigning ports PBU2-2 and PBD2-2 to the connection respecting base station (BS) $126_{2,2}$. Further, ports PBU1-2 and PBU2-2 are connected to ports PD3 and PD4, respectively, while ports PBD 1-2 and PBD2-2 are connected to ports PD5 and PD6, respectively. Ports PD3 and PD4 of switch $140_2$ are connected to uplink lines $178_2$ for eventually transmitting frames to frame selector $166_2$ [see FIG. 6]. Ports PD5 and PD6 of switch $140_2$ are connected to downlink lines $176_2$ for eventually obtaining frames from frame splitter $162_2$ [see FIG. 6].

Operation 7-6 shows RNC control unit $142_2$ of Target RNC $122_2$ sending a signaling message with an additional link setup request to each of the base stations owned by Target RNC $122_2$ which are serving mobile station MS. These signaling messages are sent over semipermanent connections established at start-up of the base stations. RNC control unit $142_2$ knows how to set up these signaling messages in view of the parameters received in the moveover request [see operation 7-3]. The signaling messages sent for operation 7-6 each include an identity of the transceiver and an identity of the allocated connection in the link between Target RNC $122_2$ and the respective base station. Although unillustrated, it should be understood that in sending the signaling messages that RNC control unit $142_2$ is connected internally through switch $140_2$ to ports PBD1 and PBD2.

The additional link setup request sent to base station (BS) $126_{2,1}$ and base station (BS) $126_{2,2}$ at operation 7-6 instruct the base stations to connect their transceivers in parallel to Target RNC $122_2$ via the connections specified in the additional link setup request. The transceivers are already connected to Source RNC $122_1$, i.e., base station (BS) $126_{2,1}$ is already connected via ports PBU1-1 and PBD1-1; base station (BS) $126_{2,2}$ is already connected via ports PBU2-1 and PBD2-1. The new parallel connections for base station (BS) $126_{2,1}$ involve ports PBU2-1 and PBD2-1; the new parallel connections for base station (BS) $126_{2,2}$ involve ports PBU2-2 and PBD2-2. The involved base stations, i.e., base station (BS) $126_{2,1}$ and base station (BS) $126_{2,2}$, each connect their transceiver to the connection and send a confirmatory response message to Target RNC $122_2$ Target RNC $122_2$ as operation 7-7 [see FIG. 7].

Operation 7-8 of FIG. 7 is a synchronization procedure between the involved base stations, i.e., base station (BS) $126_{2,1}$ and base station (BS) $126_{2,2}$, and diversity handover unit (DHU) $130_2$. Aspects of the synchronization procedure are discussed subsequently.

Figure 5A:
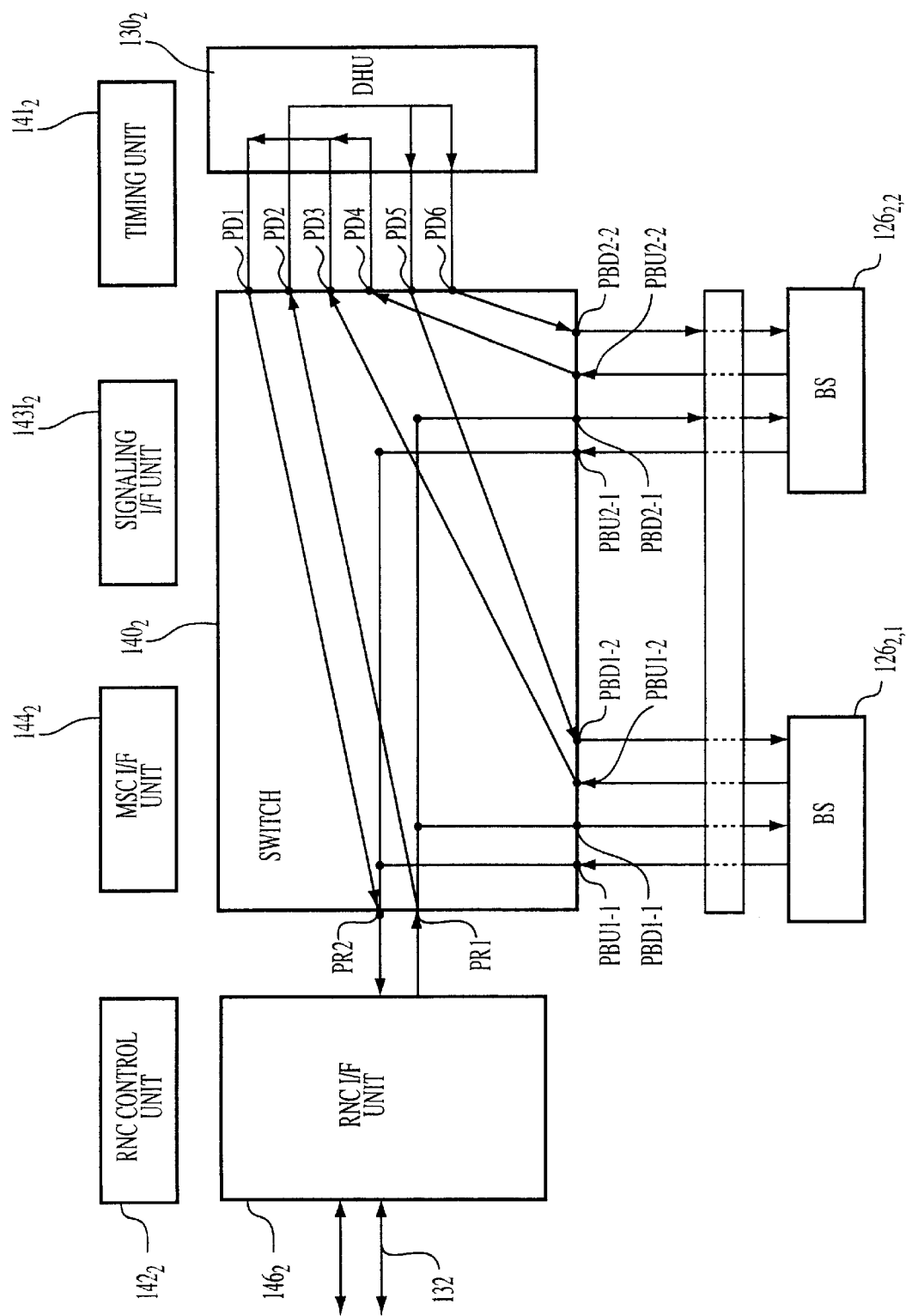

At the time shown in FIG. 5A, base station (BS) $126_{2,1}$ and base station (BS) $126_{2,2}$ transmit information routed through Source diversity handover unit (DHU) $130_1$ to mobile station MS in the downlink. In the uplink, on the other hand, both base station (BS) $126_{2,1}$ and base station (BS) $126_{2,2}$ send the same received data (although perhaps of differing quality) and control information to both Source diversity handover unit (DHU) $130_1$ and Target diversity handover unit (DHU) $130_2$.

When all affected base stations have been synchronized, as operation 7-9 RNC control unit $142_2$ of Target RNC $122_2$ sends a signaling message to Source RNC $122_1$. The signaling message of operation 7-9 includes a switchover request. Prior to switchover in Source RNC $122_1$, all traffic on inter-RNC link 132 involving all legs of the mobile connection with mobile station MS from/to RNC I/F unit $146_1$ were routed through switch $140_1$ and diversity handover unit (DHU) $130_1$, as indicated by the lines PRE-X in FIG. 3. Upon receipt of the switchover request, RNC control unit $142_1$ of Target RNC $122_2$ performs a switchover procedure as indicated by operation 7-10 [see FIG. 7]. The switchover procedure preferably occurs in between frame transmission in order to avoid frame lost, else synchronization/time alignment must previously be reached between Source RNC $122_1$ and Target RNC $122_2$.

In the switchover procedure of operation 7-10, RNC control unit $142_1$ operates switch $140_1$ to connect RNC I/F unit $146_1$ through switch $140_1$ to MSC IF/unit $144_1$, as shown by the line POST-X in FIG. 3. As a result of the switchover, frames from MSC $124_1$ are routed through switch $140_1$ for application by RNC I/F unit $146_1$ to inter-RNC link 132, and in Target RNC $122_2$ through switch $140_2$ and to diversity handover unit (DHU) $130_2$. The frames are split in diversity handover unit (DHU) $130_2$ for application to both of base station (BS) $126_{2,1}$ (through port PBD1-2) and base station (BS) $126_{2,2}$ (through port PBD2-2). Moreover, frames destined for MSC $124_1$ are routed through switch $140_2$ to diversity handover unit (DHU) $130_2$ where they are combined, with a resultant (e.g., best) frame being routed via switch $140_2$ and applied by RNC I/F unit $146_2$ to inter-RNC link 132. In Source RNC $122_1$ the frames are routed through switch $140_1$ to MSC $124_1$, bypassing diversity handover unit (DHU) $130_1$.

Figure 5B:
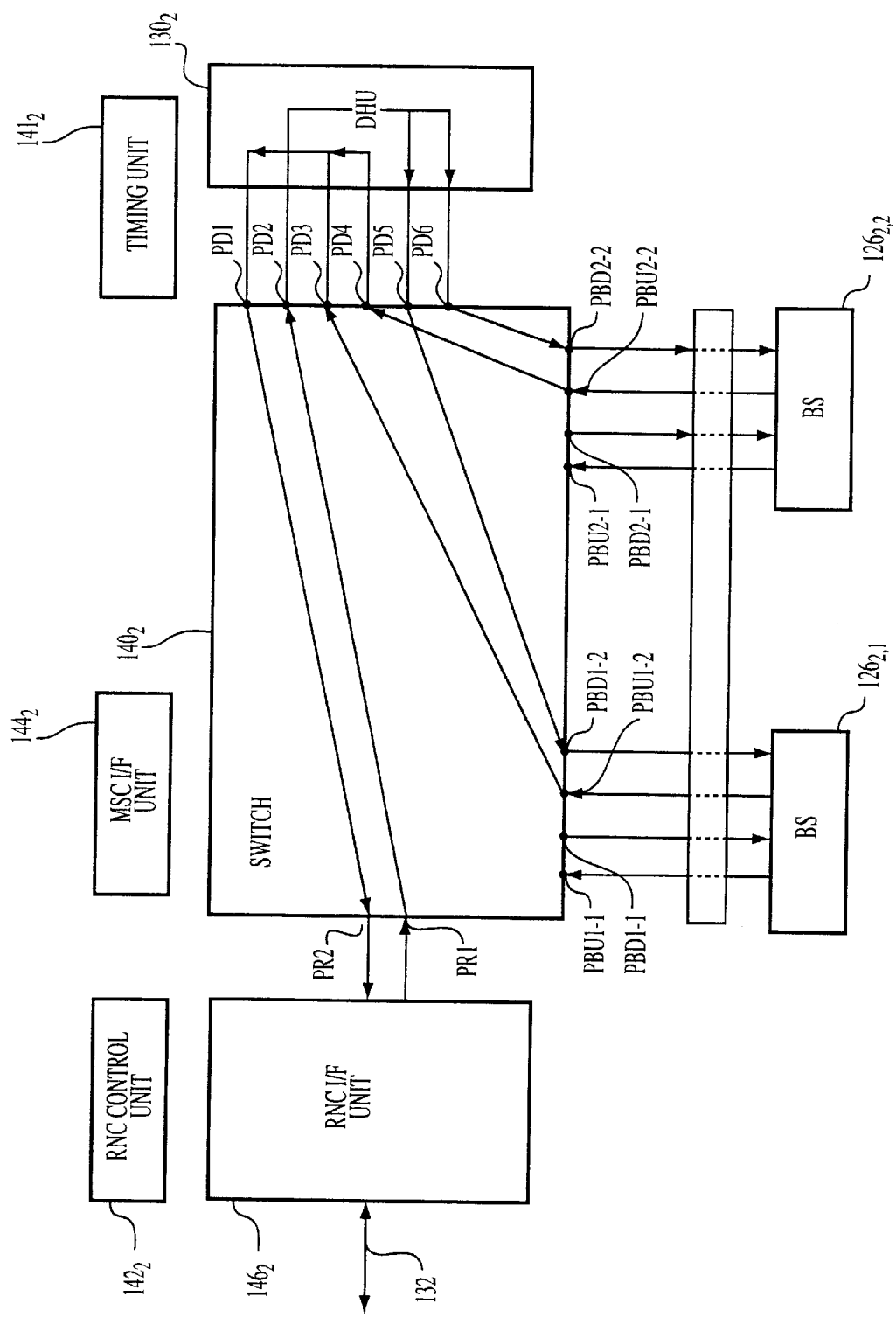

As indicated by operation 7-11, upon completion of switchover Source RNC $122_1$ sends a signaling message to Target RNC $122_2$ with a switchover confirmation. Upon receipt of the switchover confirmation, RNC control unit $142_2$ of Target RNC $122_2$ operates switch $140_2$ to release ports PBU1-1 and PBD1-1 formerly used by base station (BS) $126_{2,1}$, and ports PBU2-1 and PBD2-1 formerly used by base station (BS) $126_{2,2}$. The DHU at Source RNC $122_1$ thus then becomes an available resource. At this point, the mobile connection with mobile station MS involves only the legs which utilize the base station-connecting ports newly involved in connection with the diversity handling moveover. FIG. 5B shows the legs of the mobile connection for mobile station MS within Target RNC 122.

Figure 8:
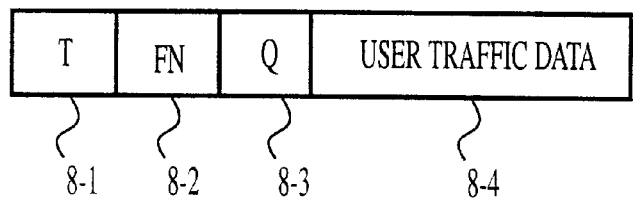
FIG. 8, FIG. 8A, FIG. 8B, and FIG. 8C are diagrammatic view of frames according to an embodiment of the invention.
Figure 8A:
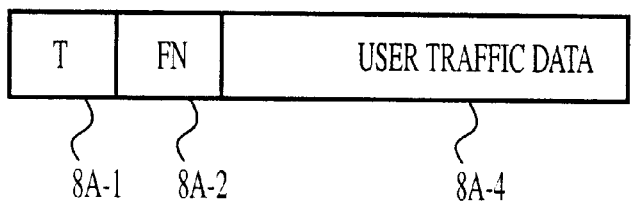

In addition to signaling messages such as those described with reference to FIG. 7 (which can be similar to the MAP protocol employed in GSM), inter-RNC link 132 carries traffic or user frames as well as dummy frames and synchronization adjustment frames. Examples of traffic frame formats are shown in FIG. 8 and FIG. 8A. FIG. 8 particularly shows an uplink traffic frame which has a frame type field 8-1; a frame number field 8-2; a quality indicator field 8-3; and, a user traffic data field 8-4. FIG. 8A shows a downlink traffic frame which has a frame type field 8A-1; a frame number field 8A-2; and, a user traffic data field 8A-4.

An example of contents of the quality indicator fields 8-3 and 8-4 is a received signal-to-noise ratio (SIR) for the frame. In addition, a checksum result for the frame could be included in the quality indicator fields 8-3 and 8-4. The quality indicator is used by the frame selector in the diversity handover unit (DHU) to select and forward (to the appropriate mobile switching center MSC) the user traffic data of the best frame, of all of the frames received with a given frame number from all base stations involved for the connection with mobile station MS. The frame splitter, on the other hand, copies the user traffic data to all base stations involved in the connection for mobile station MS, and attaches the frame number for field 8A-2 [see FIG. 8A]. The timing unit (e.g., timing unit $141_1$) supplies the diversity handover unit (DHU) with a frame number and with a frame number clock reference.

Figure 8B:
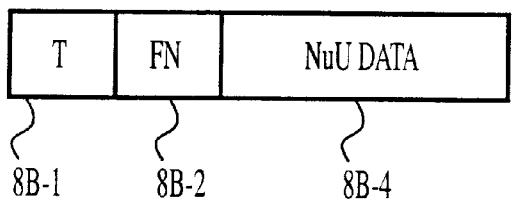

A dummy frame, an example of which is illustrated in FIG. 8B, can be used for establishment of communication and synchronization when no real traffic is to be sent. The dummy frame is also used in the downlink from Target diversity handover unit (DHU) $130_2$ to the base stations before switchover to establish synchronization. The example dummy frame of FIG. 8B includes a frame type field 8B-1, a frame number field 8B-2, and a dummy data field 8B-4.

Figure 8C:
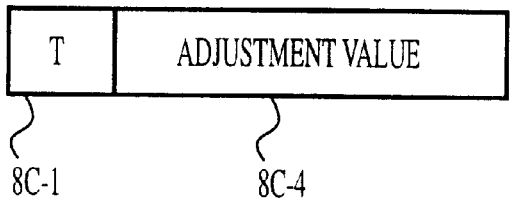

A synchronization frame, such as that shown in FIG. 8C, is employed to carry synchronization adjustment values. The example of the synchronization frame shown in FIG. 8C includes a frame type field 8C-1 and an adjustment value data field 8C-4. In one mode of the invention, the adjustment value data field 8C-4 contains a positive or negative time offset value.

As mentioned above, such as with reference to operation 7-1 of FIG. 7, for example, RNC control unit $142_1$ of Source RNC $122_1$ determines when to initiate a diversity handover unit moveover procedure. In the preferred embodiment, such decision is based on optimization of transmission resources. One example of logic implemented in the course of the diversity handling moveover decision is reflected in FIG. 9.

Figure 9:
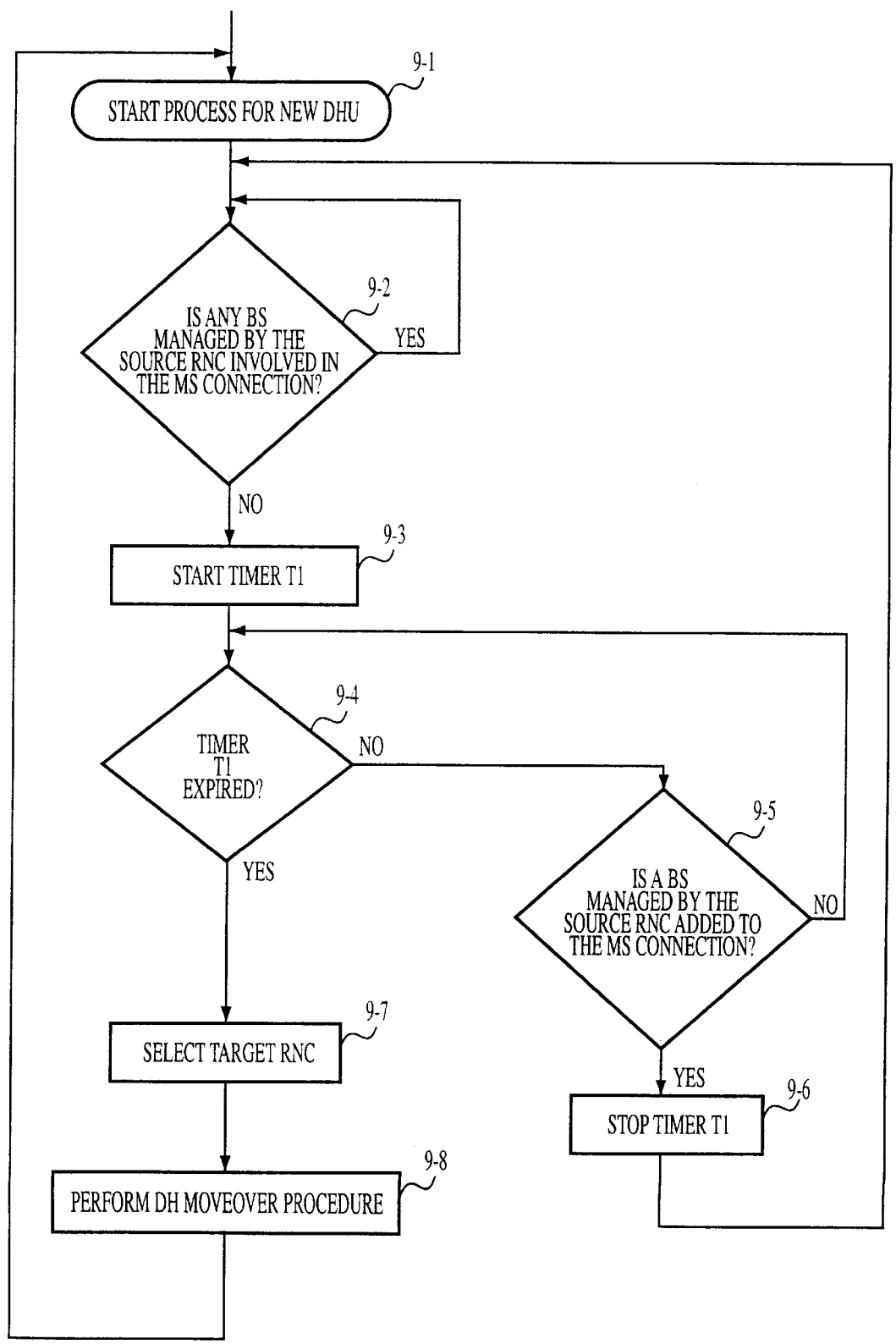
FIG. 9 and FIG. 9A are flowcharts showing different variations of logic for making a diversity handling moveover decision according to the invention.

The diversity handover unit moveover decision logic of FIG. 9 involves (after an initialization step 9-1) a periodic determination (at step 9-2) whether any base station managed by Source RNC $122_1$ is involved in the mobile connection with mobile station MS. If the determination at step 9-2 is negative (i.e. "yes"), execution loops back to re-check the determination of step 9-2 at a future time. However, should the determination of step 9-2 be positive, i.e., no base station managed by Source RNC $122_1$ is involved with mobile station MS, a Timer T1 is set (step 9-3). As seen hereinafter, Timer T1 is employed to counteract a potential ping-pong effect. As indicated by steps 9-4 and 9-5, if a base station managed by Source RNC $122_1$ is added to the mobile connection for mobile station MS before Timer T1 expires, the potential DHU moveover is quelched and (at step 9-6) Timer T1 is stopped and reset prior to looping back to step 9-2. If Timer T1 expires before a base station managed by Source RNC $122_1$ is added to the mobile connection for mobile station MS, steps 9-7 and 9-8 are performed. At step 9-7, another RNC is selected as the Target RNC. Once the Target RNC has been selected, the DHU moveover procedure as described in FIG. 7 is performed (as represented by step 9-8 of FIG. 9).

Figure 10:
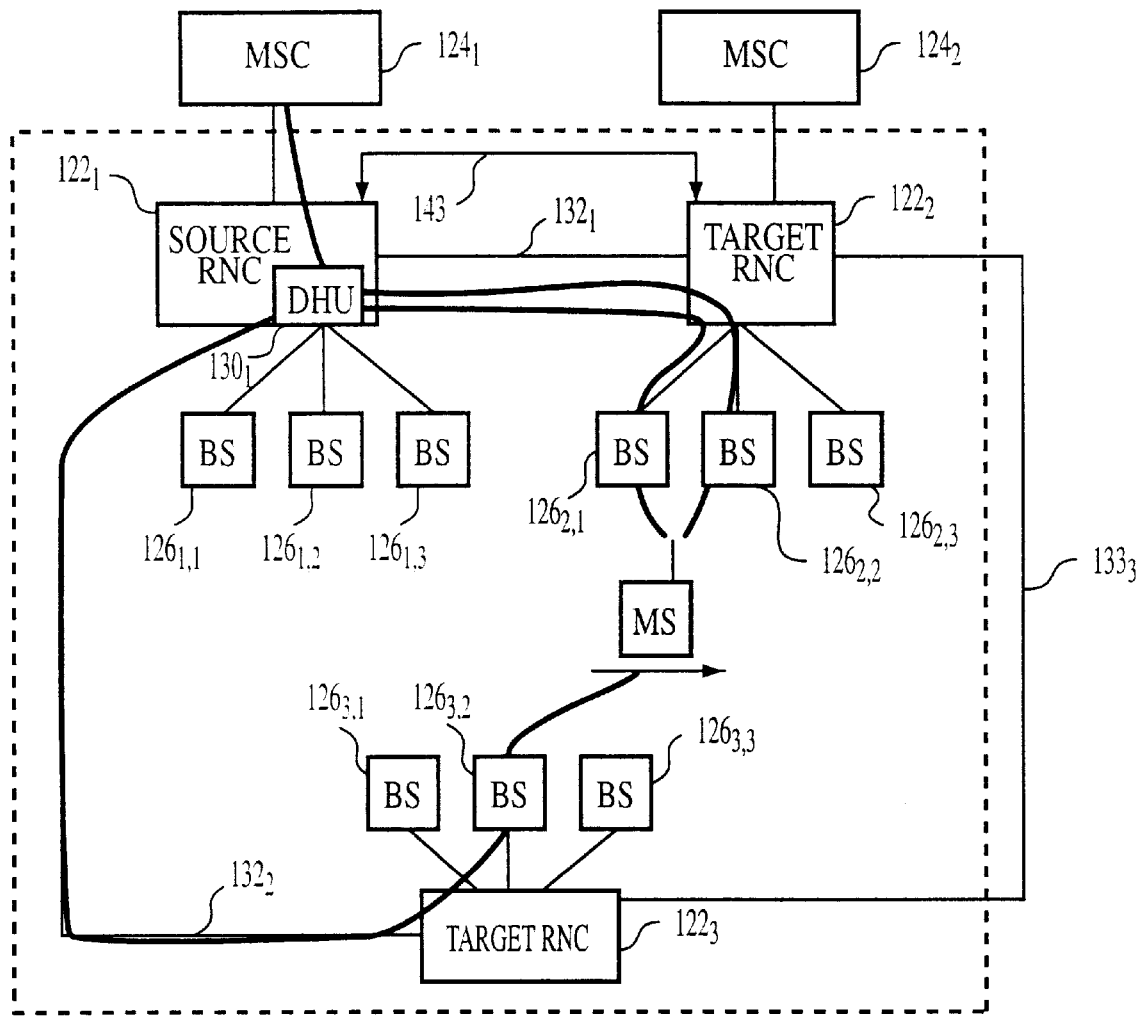
FIG. 10 is diagrammatic view of a radio network area having more than two radio network controllers.

In connection with step 9-7 of FIG. 9 described above, it is possible that mobile station MS may be in radio contact with base stations, some of whom belonging to differing RNCs. For example, in the scenario depicted in FIG. 10, Source RNC $122_1$ would have to select between Target RNC $122_2$ and Target RNC $122_3$ as candidates for the diversity handling moveover procedure. It will be appreciated that yet more RNCs may be in contention for receipt of the diversity handling function, the configurations shown herein being exemplary and not limiting.

Variations of the diversity handling moveover decision logic of FIG. 9 occur in differing embodiments. Whereas the example of FIG. 9 requires that no base station be managed by Source RNC $122_1$ before the diversity handling moveover is performed, other variations have differing moveover criteria relative to the number of base stations managed by the Source RNC $122_1$ and the Target RNC $122_2$. For example, moveover criteria may be satisfied in one variation in which Source RNC $122_1$ manages only one base station involved in the mobile connection, and Target RNC $112_2$ manages a predetermined number (greater than one) of base stations involved in the mobile connection.

As an example of another variation, information regarding directionality of movement of mobile station MS may be considered for determining when to perform the diversity handling moveover. In this regard, RNC control unit $142_1$ can administer a database wherein is stored a log of coordinates or other geographical indicative information ascertained from mobile station MS or actually reported by mobile station MS. By analysis of such log, RNC control unit $142_1$ can determine a vector of current movement for mobile station, or a prediction based on prior history of movement of mobile station, and use such vector or prediction for determining a point at which diversity handling moveover would optimize resources of the radio network area.

Information regarding directionality of movement of mobile station MS may be used as a factor when selecting among plural RNCs for a new DHU situs is required [see, for example, selection step 9-7 of FIG. 9].

Another variation of the diversity handling moveover decision logic of FIG. 9 is based on transmission cost. According to this variation, total transmission costs for an existing connection to mobile station MS (including all legs reaching all base stations) is first determined. Then, for each potential RNC to which diversity handling could be moved, a total cost is determined for the connection for mobile station (again including all legs reaching all base stations). Total cost is computed by an operator-defined or self-configured metric, and includes the cost of transmission between any pair of RNCs and the cost of transmission between an RNC and the base stations it manages. In accordance with this variation, the diversity handling moveover is performed when an RNC other than the current Source RNC is determined to provide lower transmission costs (including threshold margins).

Figure 9A:
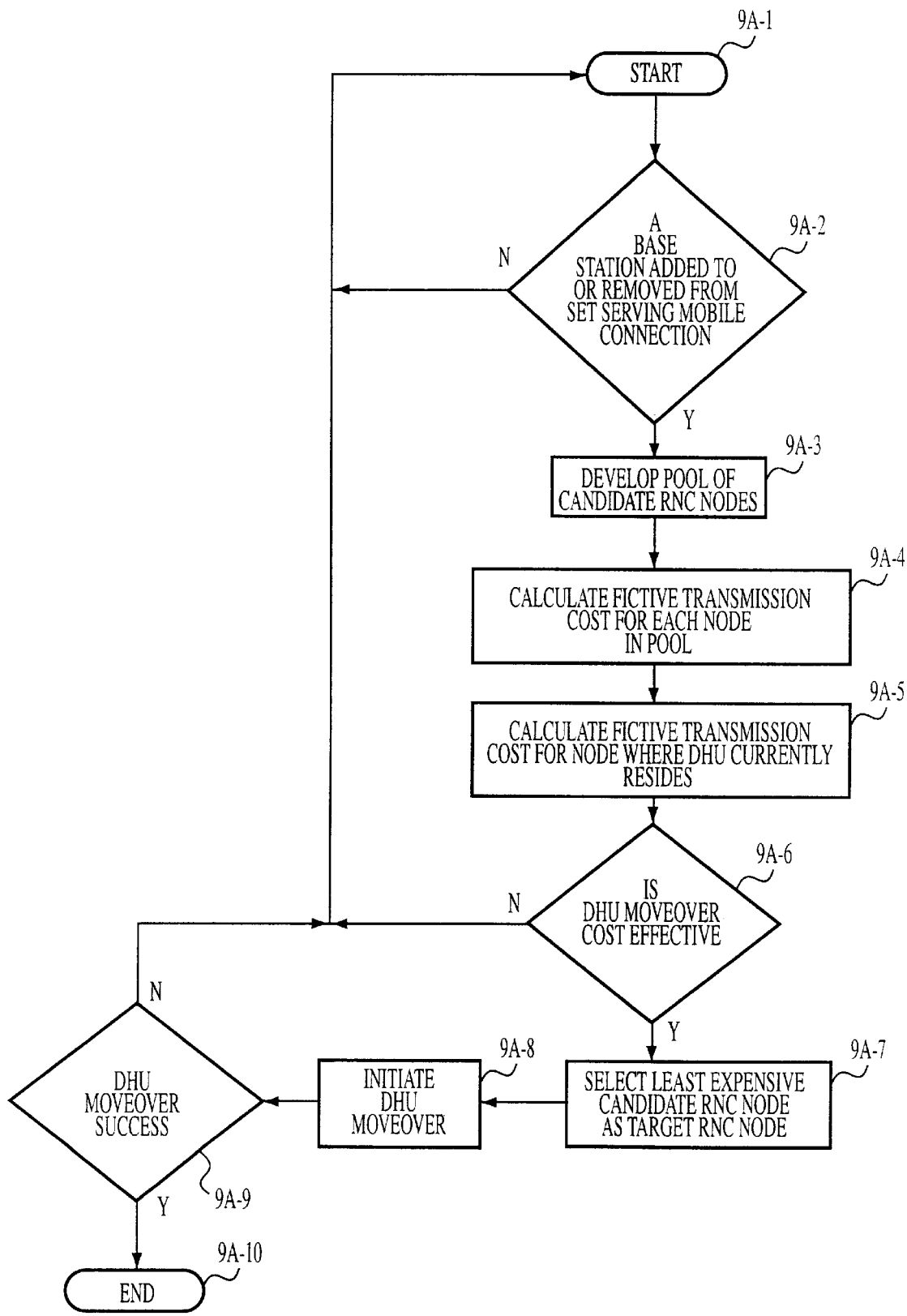

FIG. 9A shows an example of diversity handing moveover decision-making which is based on such factors as transmission cost as summarized above. Step 9A-1 shows starting and initialization of the decision-making logic of FIG. 9A. At step 9A-2, it is determined whether a base station has been added or removed from the set of base stations involved in the soft handover servicing of the mobile connection. If there is no change in the membership of the set of base stations, the logic of FIG. 9A loops back to step 9A-1 so that the membership can be respectively monitored.

If the membership of the set does change, at step 9A-3 a pool of candidate RNC nodes is developed. The pool does not include the RNC node at which the DHU currently resides. Then, at step 9A-4 the fictive transmission cost for each candidate RNC node in the pool is calculated. Similarly, at step 9A-5 the fictive transmission cost for the node where the DHU currently resides is calculated.

At step 9A-6, it is determined whether it is cost effective to have a DHU moveover. The cost effectiveness is determined by (1) finding the candidate RNC node with the least fictive transmission cost, (2) adding a marginal or threshold margin cost factor to the fictive transmission cost of the least expensive candidate RNC node, and (3) comparing the same with the fictive transmission cost of the RNC node where the DHU currently resides. If the RNC node where the DHU currently resides remains the least expensive, no DHU moveover is necessary and the logic loops back to step 9A-1.

If it is determined at step 9A-6 that a DHU moveover is cost effective, at step 9A-7 the candidate RNC node with the least fictive transmission cost is selected to be the target RNC node. Then, at step 9A-8 the DHU moveover to the Target RNC node (selected at step 9A-7) is initiated. If it is determined at step 9A-9 that the DHU moveover was a success, the logic of FIG. 9A terminates as shown by step 9A-10. Otherwise, the logic of FIG. 9A is re-started by a loop back to step 9A-1.

The calculations of steps 9A-4 and 9A-5 to determine fictive transmission costs are now described for a representative node (RNC(i). It is assumed for sake of discussion that there are "j" number of base stations included in the set involved in soft handover for the mobile connection, and that each base station BS(I) is described as being controlled by RNC(r(j)). Then, the fictive transmission cost C(i) for node RNC(i) is determined as follows:

$$c(i) = \sum_{1}^{j} \text{cost}(RNC(i) \text{ to } RNC(r(j))) + \text{cost}(RNC(anchor) \text{ to } RNC(i)).$$

The meaning of "anchor" will hereinafter be explained, but in the mode illustrated in FIG. 2. The anchor RNC can be presumed to be the Source RNC. The cost for the various RNC to RNC connections can be set or input by operation command. Alternately, information can be utilized from a routing protocol such as PNNI, specified by ATM-Forum. One possibility is to use the number of intermediate switching nodes as a metric. For example, the cost between two RNC nodes can be the number of intermediate switching nodes in the transmission path between the two RNC nodes.

In certain situations, a mobile connection for mobile station MS may be supported by two or more diversity handover units (DHUs) in parallel, e.g., for different logical channels/services. An example of such a situation is a mobile station having plural services (e.g. multimedia services), in which each service has one of a corresponding plurality of logical channels in parallel. These logical channels may have different requirements for bitrate, delay, and other characteristics. In this example, one DHU serves one logical channel. In the base station the logical channels for such a mobile connection are multiplexed with code channels. Thus, there is a base station-RNC(DHU)-MSC connection for each logical channel. Even if the logical channels are handled together over the radio interface (e.g., BS-MS), they can be treated separately after the base station. In such case, each DHU can be moved independently using the DHU moveover procedure of the present invention. The DHU for the control channel signaling defines the role of the Source RNC and thus is moved last.

As employed herein, synchronization includes the principle that existing timing on the radio interface is maintained, e.g., frames are exchanged between the base stations and the mobile station at, e.g., 10 millisecond intervals in a certain phase. After connections have been set up between Target RNC $122_2$ and all involved base stations (e.g., base station (BS) $126_{2,1}$ and base station (BS) $126_{2,2}$), a series of events occur between Source RNC $122_1$ and Target RNC $122_2$.

In the uplink between Source RNC $122_1$ and Target RNC $122_2$, a base station transmits frames received from mobile station MS to both Target diversity handover unit (DHU) $130_2$ and Source diversity handover unit (DHU) $130_1$. The set of uplink buffers 168 of diversity handover unit (DHU) $130_2$ receive frames from different (e.g., both) base stations. For frames having the same frame number for the same connection, frame selector $166_2$ selects the frame with best quality indicator [see FIG. 8]. The uplink frames are forwarded to Source RNC $122_1$ (at least before the switchover is requested from Target RN $122_2$). Target diversity handover unit (DHU) $130_2$ indicates to RNC control unit $142_2$ when synchronization is established.

In the downlink, diversity handover unit (DHU) $130_2$ determines an initial departure time for numbered downlink frames based on the received numbered uplink frames, and starts transmitting numbered downlink dummy frames [see FIG. 8B]. The base stations receive the numbered dummy frames and instruct diversity handover unit (DHU) $130_2$ to adjust its departure time if the frames arrive too early or too late. Further, the base stations indicated to RNC control unit $142_2$ when synchronization is established.

When Target RNC $122_2$ determines that synchronization is established for both uplink and downlink, Target RNC $122_2$ so informs Source RNC $122_1$ using the switchover request of operation 7-9 [see FIG. 9]. At that point, Source RNC $122_1$ performs the switchover procedure 7-10 as described above. When valid frames start to arrive from Target RNC $122_2$ to each involved base station (e.g., base station (BS) $126_{2,1}$ and base station (BS) $126_{2,2}$), the base stations start transmitting (to mobile station MS) the frames received from Target RNC $122_2$ rather than the frames received from Source RNC $122_1$.

If the total delay is increased using diversity handover unit (DHU) $130_2$ of Target RNC $122_2$, certain activities may occur. For example, if time alignment to the mobile switching center (MSC) is supported, diversity handover unit (DHU) $130_2$ can send commands to the mobile switching center (MSC) to adjust its timing. During this adjustment process, however, some frames may be lost. If time alignment to the mobile switching center (MSC) is not supported, a frame slip may occur. To avoid this problem, an initial connection should be set up with sufficient delay margins (e.g., some extra buffering in diversity handover unit (DHU) $130_1$).

Figure 11:
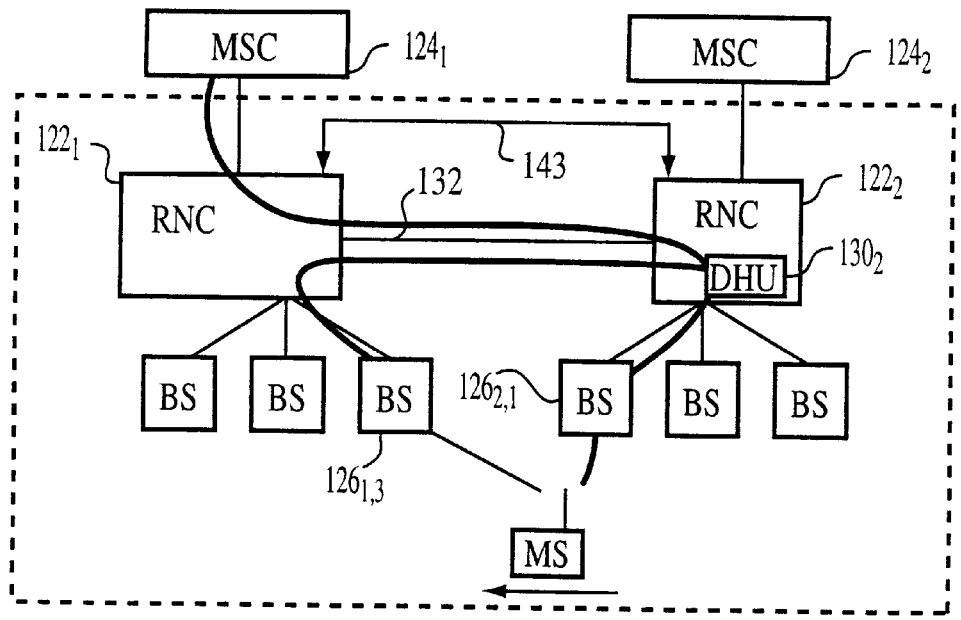
FIG. 11, FIG. 11A, FIG. 11B, and FIG. 11C are each diagrammatic views showing differing stages of management of the mobile connection of FIGS. 2–FIG. 2B as diversity handoff units moveover returns from a second radio network controller to a first radio network controller, with the mobile connection utilizing a MSC connected to the first radio network controller.

FIGS. 2–FIG. 2C illustrates diversity handling moveover, e.g. moveover from DHU $130_1$ of RNC $122_1$ to DHU $130_2$ of RNC $122_2$, as mobile station MS traveled to utilize only base station BS $126_{2,1}$ and $126_{2,2}$ controlled by RNC $122_2$. FIGS. 11–FIG. 11C progressively show stages of a return diversity handling moveover as mobile station MS travels back to utilize only base station BS $126_{1,2}$ and $126_{1,3}$ controlled by RNC $122_1$.

Figure 11A:
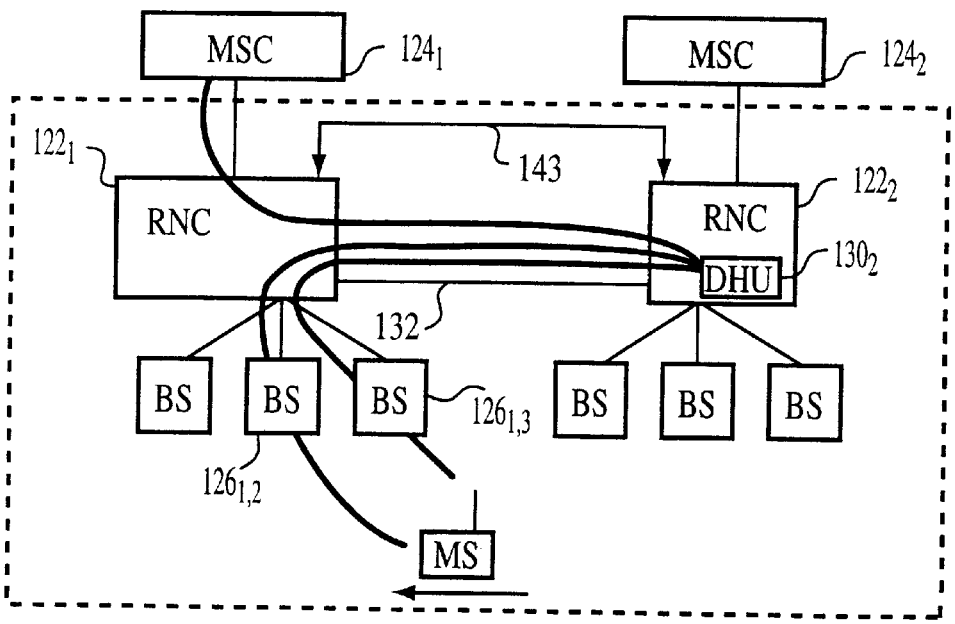
Figure 11B:
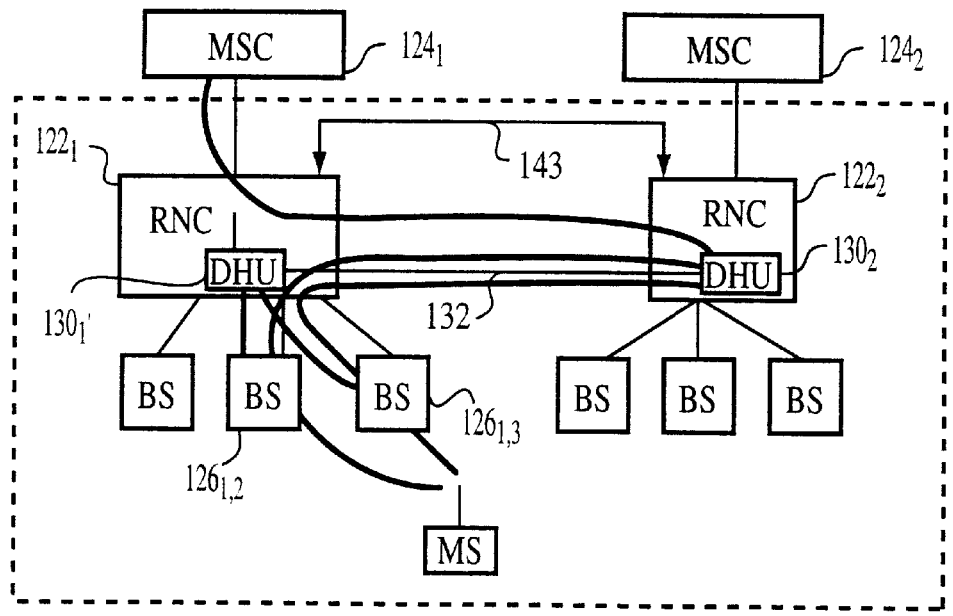
Figure 11C:
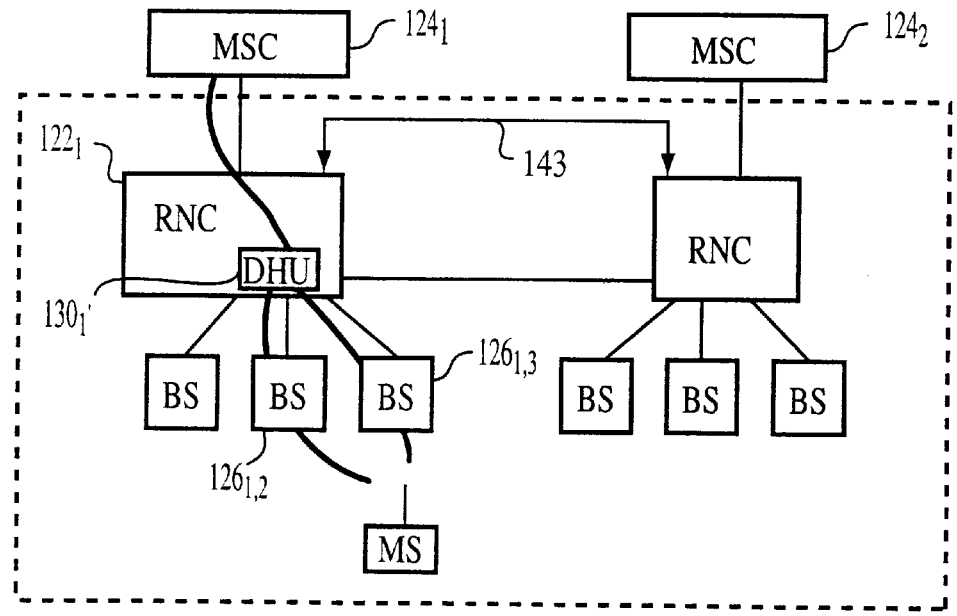

The procedures and operations involved in the return of diversity handling moveover, especially as depicted in FIGS. 11A–FIG. 11C are understood from analog to the procedures and operations aforedescribed with respect to FIGS. 2–FIG. 2B, respectively. However, since the DHU allocated in RNC $122_1$ upon return diversity handling moveover is, in fact, newly allocated and not necessarily the same as former DHU $130_1$, the new DHU of RNC $122_1$ is referenced in FIGS. 11B–FIG. 11C as DHU $130_1$.

The return diversity handling moveover of FIGS. 11–FIG. 11C is conducted under the condition that DHU $130_2$ of RNC $122_2$ is connected via RNC $122_1$ to the MSC $124_1$ handling the mobile connection. Thus, until diversity handling moveover returns back to RNC $122_1$ as depicted in FIG. 11C, the inter-RNC link 132 carries both (1) frames between MSC $124_1$ and DHU $130_2$, (2) frames between DHU $130_2$ and base station BS $126_{1,2}$, and (3) frames between DHU $130_2$ and base station $126_{1,3}$ [see FIG. 11A]. MSC $124_1$ is connected to RNC $122_1$.

Figure 12:
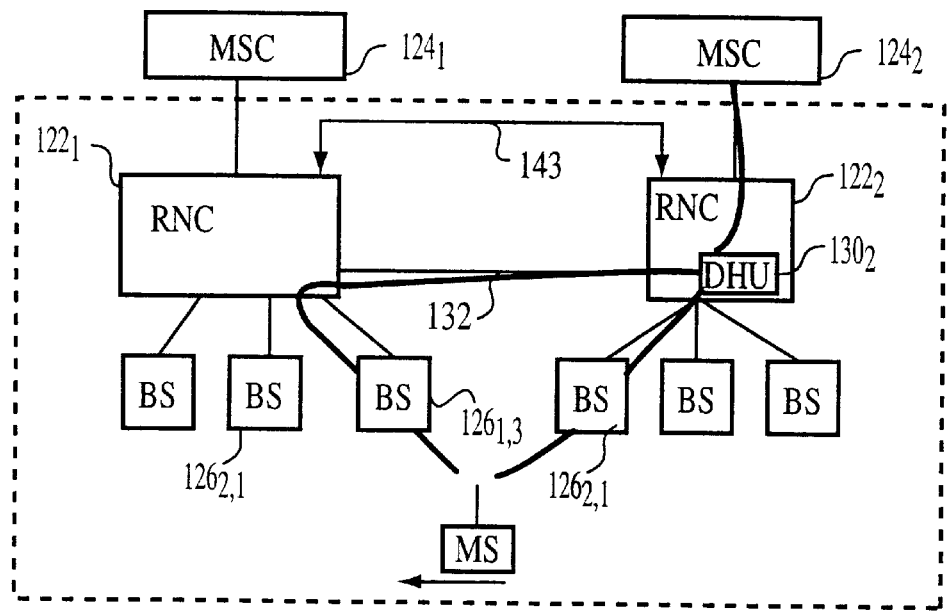
FIG. 12, FIG. 12A, FIG. 12B, and FIG. 12C are diagrammatic views similar to FIG. 11, FIG. 11A, FIG. 11B, and FIG. 11C, respectively, but with the mobile connection utilizing a MSC connected to the second radio network controller.
Figure 12A:
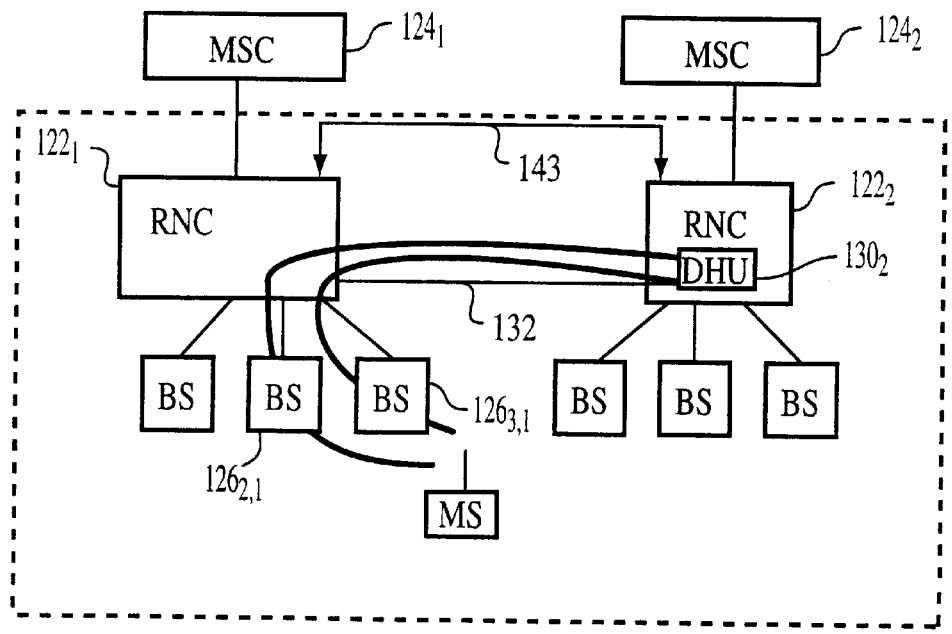
Figure 12B:
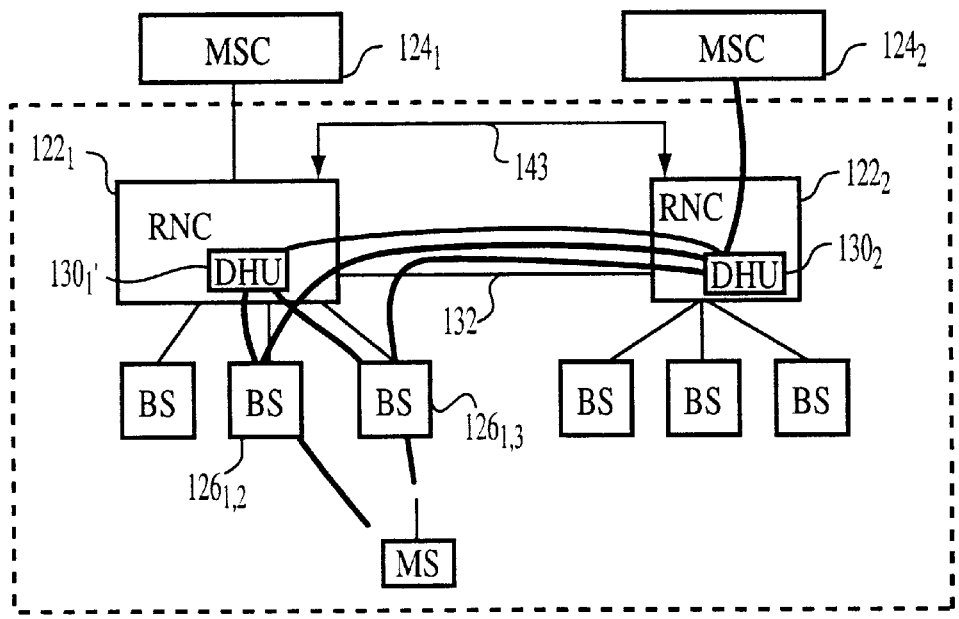
Figure 12C:
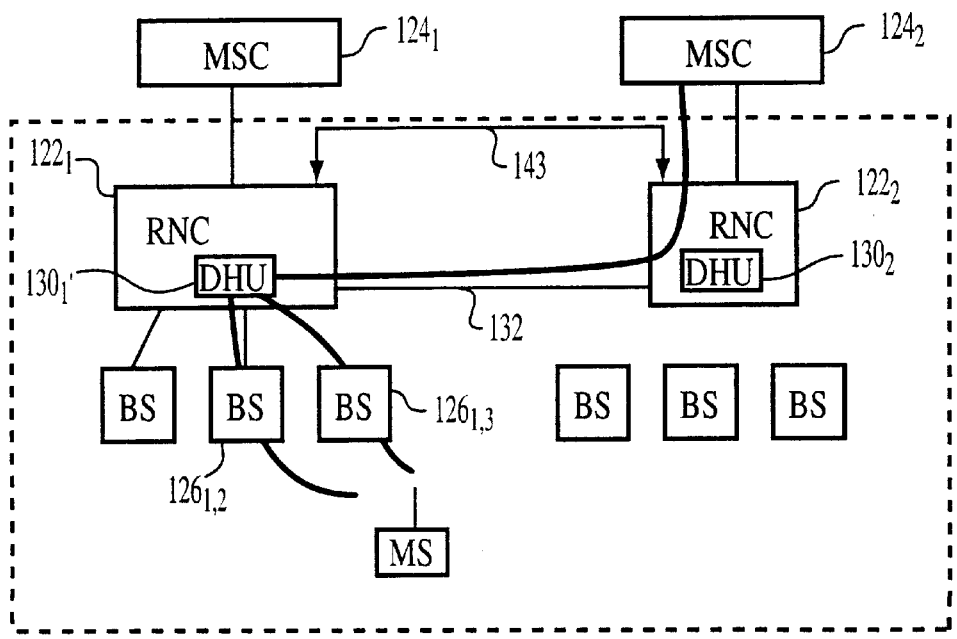

The situation depicted in FIGS. 11A–FIG. 11C of having inter-RNC link 132 carrying so many frames can be obviated if, at an appropriate time (such as the time between the times shown by FIG. 2B and FIG. 11, for example) there is a change of MSC handling the mobile connection. For example, traffic on inter-RNC link 132 can be reduced if the mobile connection is changed such that MSC $124_2$ is utilized rather than MSC $124_1$. When such a change of MSC is implemented, the return diversity handling moveover back to RNC $122_1$ is as shown in FIGS. 12–FIG. 12C rather than as in FIGS. 11–FIG. 11C. At the time shown in FIG. 12C, consideration ought to be given whether the mobile connection should change back to using MSC $124_1$ rather than MSC $124_2$.

Figure 13:
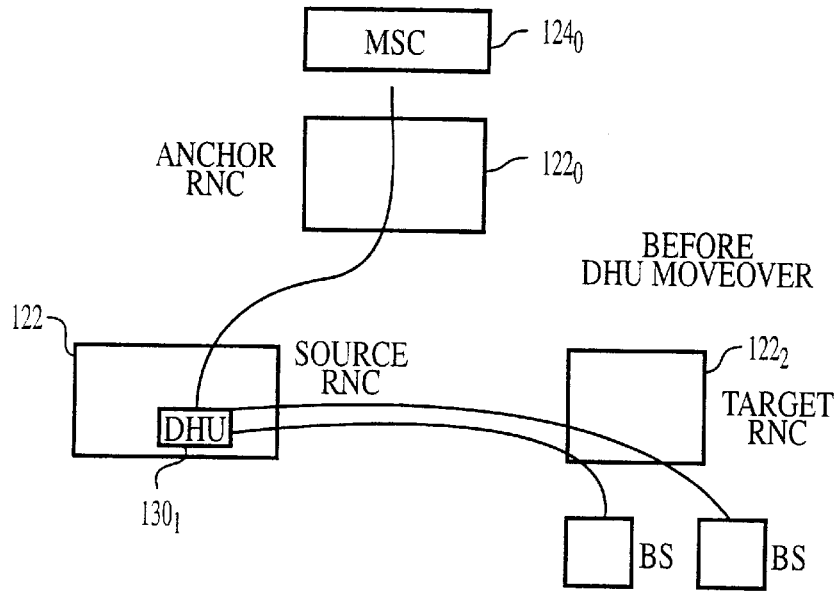
FIG. 13 and FIG. 13A are diagrammatic views respectively showing before and after performance of a diversity handover unit moveover involving three distinct radio network control nodes.
Figure 13A:
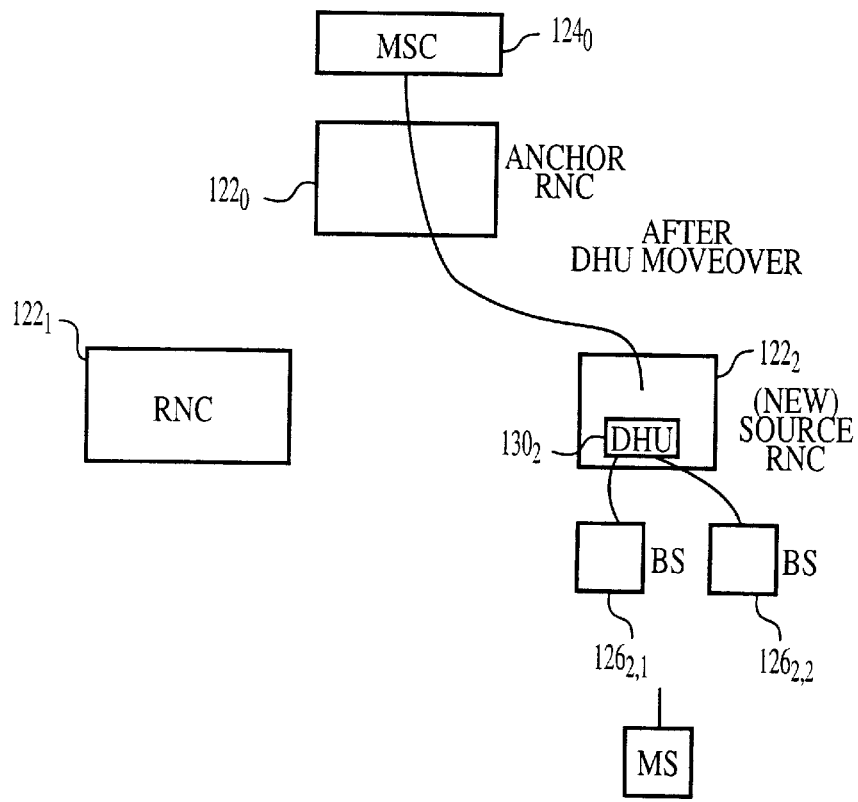

Modes of the invention previously described have involved a Source RNC $122_1$ and a Target RNC $122_2$, one of which is connected to the MSC handing the mobile connection without an intermediate RNC. FIG. 13 and FIG. 13A depict a different mode in which the mobile connection utilizes MSC $124_0$ and wherein RNC $122_0$ functions as an "anchor" RNC. An "anchor" RNC is an RNC most closely connected to the pertinent MSC for the mobile connection and is the RNC which performs the switchover of a diversity handling moveover to connect a new DHU.

In reality, all modes of the invention involve three logical RNCs for performing diversity handling moveover: (1) an "anchor" RNC which performs the switchover to connect a new DHU; (2) a "source" RNC which controls the old DHU and which initiates the diversity handling moveover procedure; and (3) a "target" RNC which controls the new DHU (and which becomes the source RNC after the diversity handling moveover procedure is completed). In the preceding mode of FIGS. 2–FIG. 2B, RNC $122_1$ functioned both as the source RNC and the anchor RNC. In the modes of FIGS. 11–FIG. 11C and FIGS. 12–FIG. 12C, on the other hand, RNC $122_2$ functioned as the anchor RNC $122_0$.

In the mode of the invention shown in FIG. 13 and FIG. 13A, anchor RNC $122_0$ performs the switchover whereby the diversity handling is moved over from DHU $130_1$ of Source RNC $122_1$ to DHU $130_2$ of target RNC $122_2$. FIG. 13 shows the situation prior to diversity handling moveover; FIG. 13A shows the situation after completion of diversity handling moveover.

Figure 14:
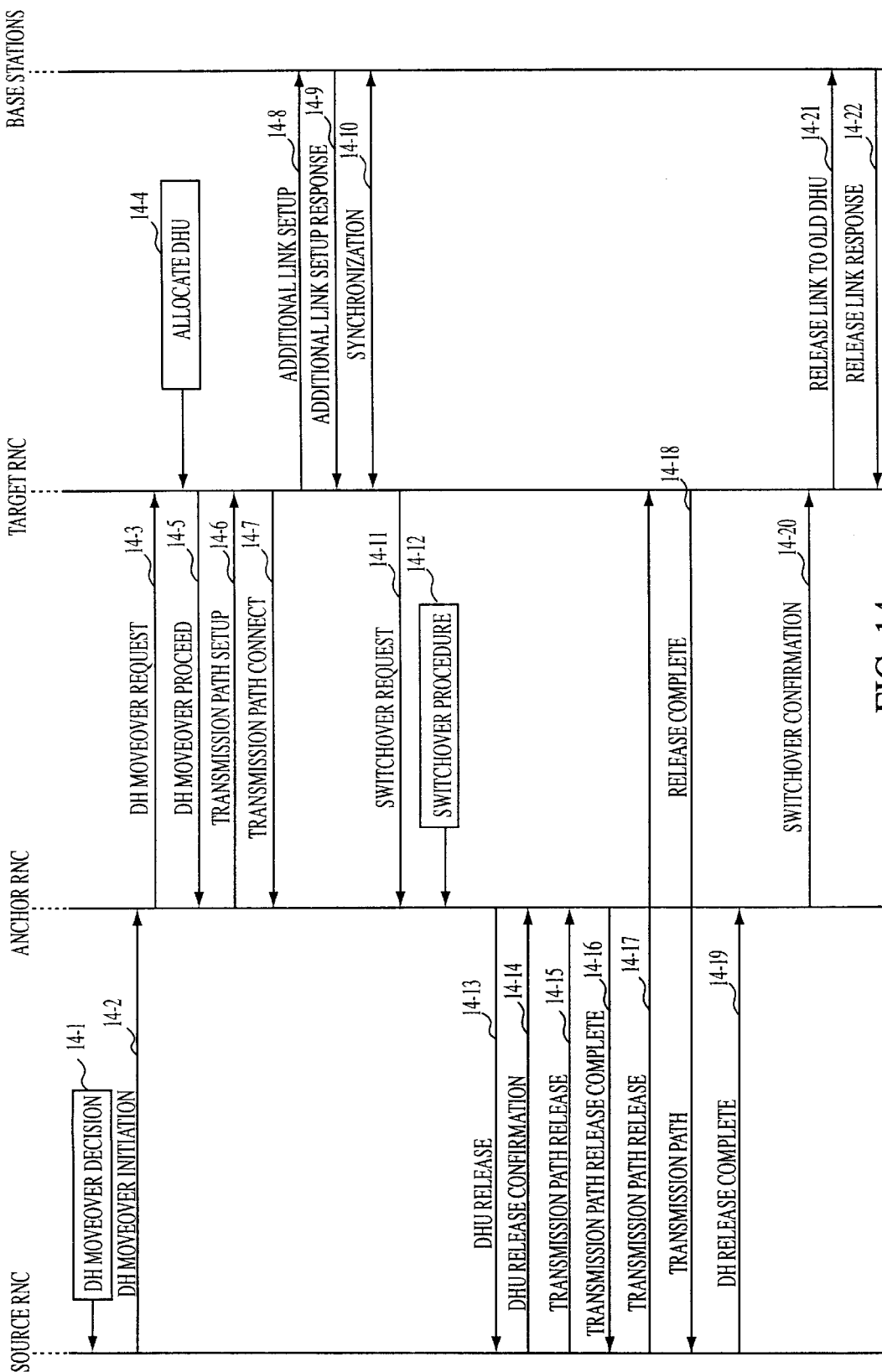
FIG. 14 is a schematic view of a sequence of operations in a diversity handover moveover procedure according to a node of the invention involving three distinct radio network control nodes.

FIG. 14 shows a sequence of operations involved in a diversity handling moveover procedure according to the mode of FIGS. 13–FIG. 13A (i.e., a mode in which an "anchor" RNC other than the source RNC or the target RNC perform the switchover). Operation 14-1 shows the Source RNC $122_1$ making a decision that a diversity handling moveover should occur. Such decision can be made according to any of the various criteria herein described, such as the criteria of FIG. 9 or FIG. 9A, for example. Once the diversity handling moveover decision has been made, set operation 14-2 source RNC $122_1$ sends a "diversity handling (DH) moveover initiation" message to anchor RNC $122_0$. Then, at operation 14-3, anchor RNC $122_0$ sends a diversity moveover request message to Target RNC $122_2$. In response, operation 14-4 shows Target RNC $122_2$ allocating a diversity handling unit (e.g., DHU $130_2$) to be the recipient of the moveover. Details of DHU allocation of operations 14-4, like various other operations of FIG. 14, are understood with reference to analogous operations previously described in connection with FIG. 7. Upon completion of the DHU allocation, at operation 14-5 target RNC $122_2$ sends anchor RNC $122_0$ a "DH moveover proceed" message.

After Target RNC $122_2$ indicates set operation 14-5 that DH moveover may proceed, at operation 14-6 anchor RNC $122_0$ sends a "transmission path SETUP" message to Target RNC $122_2$. The transmission path SETUP message of operation 14-6 serves to set up an inter-RNC transmission link connection between anchor RNC $122_0$ and Target RNC $122_2$. The message of operation 14-6 may be sent through intermediate switching nodes or via a signaling network. In some embodiments, the connection set up by operation 14-6 may be set up all the way from Anchor RNC $122_0$ to each active base station. Upon establishment of the inter-RNC transmission link connection, at operation 14-7 Target RNC $122_2$ sends a "transmission path CONNECT" message to Anchor RNC $122_0$.

Operation 14-8 involves Target RNC $122_2$ sending an "additional link setup" message to each active base station served by Target RNC $122_2$ for the mobile connection. In response, each active base station returns an "additional link setup response" message to Target RNC $122_2$. Then, at operation 14-10, synchronization occurs between Target RNC $122_2$ and each active base station.

Upon obtaining synchronization, at operation 14-11, Target RNC $122_2$ sends a "switchover request" message to Anchor RNC $122_0$. In response, at operation 14-12, the Anchor RNC $122_0$ performs the switchover procedure. After completion of the switchover, at operation 14-13, Anchor RNC $122_0$ sends a "DHU release" message to Source RNC $122_1$. In response, at operation 14-14, Source RNC $122_1$ returns a "DHU release confirmation" message. Further, as indicated by operation 14-15, Source RNC $122_1$ sends a "transmission path release" message to Source RNC $122_1$ as reflected by operation 14-16.

At operation 14-17, Source RNC $122_1$ sends a series of "transmission path release" messages to Target RNC $122_2$, one message for each active base station. In response, at operation 14-18 the Target RNC $122_2$ returns a same number series (one for each base station) of "transmission path release complete" messages to Source RNC $122_1$.

At operation 14-19 Source RNC $122_1$ sends a "DH release complete" message to Anchor RNC $122_0$. Anchor RNC $122_0$ responsively sends at "switchover confirmation" message to Target RNC $122_2$ at operation 14-20. Upon receipt of the "switchover confirmation" message, Target RNC $122_2$ sends, to each active base station, a "release link to old DHU" message (operation 14-21). In return, each active base station sends a "release link response" message to Target RNC $122_2$.

Various ones of the messages described in connection with FIG. 14 may be sent via intermediate switching nodes. Moreover, various operations or combinations of operations may be performed in parallel. For example, operations 8-11 may be performed in parallel with operations 6-7. Further operation 15-16 may be performed in parallel with operation 17-18. Message (e.g. signals) for transmission path set up, connect, release, and complete as used herein are similar to ISUP.

The mode of FIG. 13 and FIG. 13A shows a generalization of earlier depicted modes. It should be accordingly realized that the present invention encompasses systems having any number of radio network control nodes.

Figure 15:
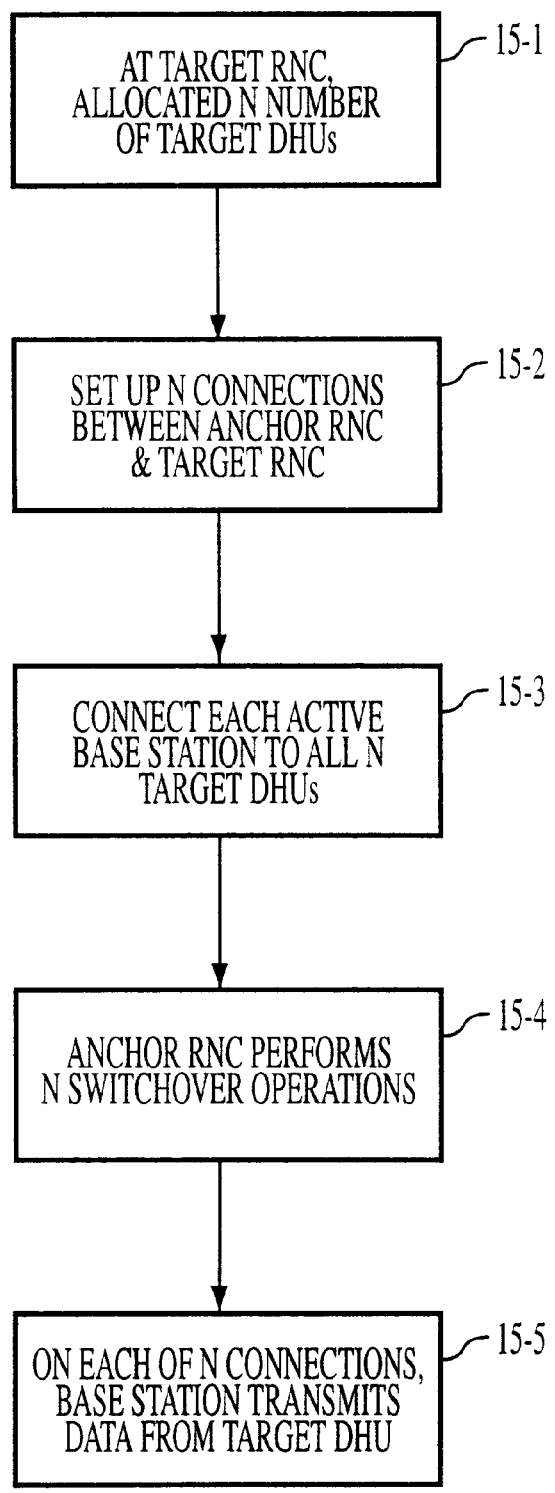
FIG. 15 is a flowchart showing operation involved in a plural DHU moveover.

The present invention also encompasses situations in which plural diversity handover units (DHUs) are moved together. FIG. 15 shows general operations performed in conjunction with a plural DHU moveover, in particular "N" number of DHUs. At operation 15-1, the target RNC allocates N number of target DHUs. Operation 15-2 shows N connections being set up between the Anchor RNC and the Target RNC. At operation 15-3, each active base station is connected to cell N target DHUs. Then, the anchor RNC performs N number of switchover operations (operation 15-4). As shown in operation 15-5, on each of the N connections, the base station transmits data from Target DHU when it arrives, and before that data from the source DHU.

It should be understood, however, that the switchover from Source DHU to Target DHU need not be simultaneous for all N connections. The switchover must not be done for all N connections to a mobile station.

In the embodiments described herein, for sake of simplicity only a limited number of base stations (BS) have been shown as connected to each RNC. It should be understood that differing and greater numbers of base stations (including just one base station) can be connected to each RNC, and accordingly that the number of downlink and uplink buffers in each diversity handover unit (DHU) is dependent thereon. Moreover, it should be understood that the radio access network, e.g. radio access network 120, can have RNCs and base stations other than and additional to those illustrated.

In the foregoing discussion, the MSC I/F units and the RNC I/F units have been illustrated as separate interfaces. It should be understood, however, that these interfaces can be combined into a single transport network interface unit.

In the embodiments herein illustrated, the connection between RNCs has been shown as a direct link. It should also be understood that such connection can instead be switched via any intermediate node. For example, in an embodiment in which such connection is switched, the intermediate node can be an MSC, an RNC, or a node in the public switched telephone network (PSTN).

Moreover, it should be understood that an RNC most probably is connected to several other RNCs (e.g., as many as eight), and that plural inter-RNC links may accordingly be provided. Thus, reference herein to connection to an inter-RNC transport links refers to an appropirate one of a potential plurality of such links.

The reader should appreciate that plural RNCs can be collocated to form "clusters", and that from outside the cluster the cluster is viewed as being a larger "logical" RNC. A physical inter-RNC connection can thus be within the bigger logical RNC as well as between RNC clusters.

All scenarios and modes of diversity handling moveover described herein presume that handover (i.e., the adding and/or removing of base station legs) is inhibited until the diversity of handling moveover procedure is completed.

The present invention provides numerous advantages, including optimization of resources of the network area. For example, the duration of utilization of legs between base stations and diversity handover units (DHUs) is reduced. Moreover, the present invention economizes transport resources on the inter-RNC links.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a telecommunications system, the method comprising:

using a first diversity handling unit to perform connection combining and connection splitting operations for a mobile connection maintained through a plurality of base stations;

allocating a second diversity handling unit to perform the connection combining and connection splitting operations only after it is determined that the connection combining and connection splitting operations should be transferred from the first diversity handling unit; and determining that the connection combining and connection splitting operations should be transferred in accordance with one of (i) addition, and (ii) disconnection of a base station involved in diversity handling of the mobile connection, wherein the added or disconnected base station remains operational in the telecommunications system after the addition or disconnection of the base station.

2. The method of claim 1, wherein a determination that the connection combining and connection splitting operation should be transferred is based on transmission cost.

3. The method of claim 1, wherein it is determined that the connection combining and connection splitting operations should be transferred in accordance with directional movement of a mobile station involved in the mobile connection.

4. The method of claim 1, wherein the first diversity handling unit is situated at a first node, the first node controlling a first set of base stations, and wherein the second diversity handling unit is situated at a second node, the second node controlling a second set of base stations.

5. The method of claim 1, further comprising:

performing a switchover operation after completion of the allocating in order to remove the first diversity handling unit from the mobile connection.

6. The method of claim 5, further comprising:

routing uplink frames from a base station participating in the mobile connection to both the first diversity handling unit and the second diversity handling unit after the allocating and before the performing of the switchover operation.

7. The method of claim 5, wherein the switchover operation is performed at an anchor node.

8. The method of claim 1, further comprising:

performing a switchover operation after completion of the allocating in order to remove the first diversity handling unit from the mobile connection, and in view of the switchover, choosing a second mobile switching center to replace a first mobile switching center for handling the mobile connection.

9. A method of operating a telecommunications system, the method comprising:

using a first diversity handling unit to perform connection combining and connection splitting operations for a mobile connection maintained through a plurality of base stations;

allocating a second diversity handling unit to perform the connection combining and connection splitting operations only after it is determined that the connection combining and connection splitting operations should be transferred from the first diversity handling unit: and determining that the connection combining and connection splitting operations should be transferred in accordance with one of (i) addition, and (ii) disconnection of a base station, wherein it is determined that the connection combining and connection splitting operations should be transferred when a predetermined relationship exists between a first number of base stations served by a node whereat the first diversity handling unit resides and a second number base stations served by a node whereat the second diversity handling unit is to reside.

10. A method of operating a telecommunications system, the method comprising:

using a first diversity handling unit to perform connection combining and connection splitting operations for a mobile connection maintained through a plurality of base stations;

allocating a second diversity handling unit to perform the connection combining and connection splitting operations only after it is determined that the connection combining and connection splitting operations should be transferred from the first diversity handling unit;

wherein the first diversity handling unit is situated at a first node, the first node controlling a first set of base stations, and wherein a second node controls a second set of base stations and a third node controls a third set of base stations; and selecting between the first node and the second node as situs for the second diversity handling unit.

11. A method of operating a telecommunications system, the method comprising:

using a first diversity handling unit to perform connection combining and connection splitting operations for a mobile connection maintained through a plurality of base stations;

allocating a second diversity handling unit to perform the connection combining and connection splitting operations only after it is determined that the connection combining and connection splitting operations should be transferred from the first diversity handling unit;

performing a switchover operation at least partially at an anchor node after completion of the allocating in order to remove the first diversity handling unit from the mobile connection; and wherein the first diversity handling unit is situated at a first node, wherein the second diversity handling unit is situated at a second node and wherein the anchor node is physically distinct from the first node and the second node.

12. A telecommunications system comprising:

plural nodes each controlling a corresponding set of base stations;

a first diversity handling unit residing at a first of the plural nodes, the first diversity handling unit performing connection combining and connection splitting operations for a mobile connection maintained through a plurality of base stations;

wherein the first node causes allocation of a second diversity handling unit to perform the connection combining and connection splitting operations only after it is determined that the connection combining and connection splitting operations should be transferred from the first diversity handling unit; and wherein it is determined that the connection combining and connection splitting operations should be transferred when a predetermined relationship exists between a first number of base stations served by a node whereat the first diversity handling unit resides and a second number of base stations served by a node whereat the second diversity handling unit is to reside.

13. The apparatus of claim 12, wherein a determination that the connection combining and connection splitting operation should be transferred is based on transmission cost.

14. The apparatus of claim 12, wherein it is determined that the connection combining and connection splitting operations should be transferred in accordance with directional movement of a mobile station involved in the mobile connection.

15. The apparatus of claim 12, wherein the first node selects between remaining ones of the plural nodes as situs for the second diversity handling unit.

16. The apparatus of claim 12, wherein the second diversity handling unit requests the first diversity handling unit to perform a switchover operation after completion of the allocating in order to remove the first diversity handling unit from the mobile connection.

17. The apparatus of claim 16, wherein during the allocation a base station participating in the mobile connection routes uplink frames from to both the first diversity handling unit and the second diversity handling unit.

18. The apparatus of claim 12, wherein the switchover operation is performed at an anchor node.

19. A telecommunications system comprising:

plural nodes each controlling a corresponding set of base stations;

a first diversity handling unit residing at a first of the plural nodes, the first diversity handling unit performing connection combining and connection splitting operations for a mobile connection maintained through a plurality of base stations;

wherein the first node causes allocation of a second diversity handling unit to perform the connection combining and connection splitting operations only after it is determined that the connection combining and connection splitting operations should be transferred from the first diversity handling unit;

wherein the switchover operation is performed at an anchor node; and wherein the first diversity handling unit is situated at a first node, wherein the second diversity handling unit is situated at a second node and wherein the anchor node is physically distinct from the first node and the second node.

20. A method of operating a telecommunications system, the method comprising:

using a first diversity handling unit to perform connection combining and connection splitting operations for a mobile connection maintained through a plurality of base stations with a mobile station;

determining that the connection combining and connection splitting operations should be transferred to a second diversity handling unit in accordance with whether any base station managed by a particular network controller is involved in a connection with the mobile station; and performing a switchover operation from the first diversity handling unit to the second diversity handling unit, wherein it is determined whether the connection combining and connection splitting operations should be transferred to a second diversity handling unit in accordance with whether a predetermined amount of time has elapsed after a determination that no base station managed by the network controller is involved in the connection with the mobile station.

21. A method of operating a telecommunications system, the method comprising:

using a first diversity handling unit to perform connection combining and connection splitting operations for a mobile connection maintained through a plurality of base stations with a mobile station;

determining that the connection combining and connection splitting operations should be transferred to a second diversity handling unit in accordance with whether any base station managed by a particular network controller is involved in a connection with the mobile station; and performing a switchover operation from the first diversity handling unit to the second diversity handling unit, wherein it is determined whether the connection combining and connection splitting operations should be transferred to a second diversity handling unit in accordance with a prediction of future movement direction of the mobile station.

22. A method of operating a telecommunications system, the method comprising:

providing first and second diversity handling units, respectively;

using the first diversity handling unit to perform connection combining and connection splitting operations for a connection maintained through a plurality of base stations with a mobile station;

predicting a future direction of movement of the mobile station;

determining whether to use the second diversity handling unit to perform the connection combining and connection splitting operations for the connection, based at least in part upon the predicted future direction of movement of the mobile station.

23. The method of claim 22, wherein said predicting step comprises predicting the future direction of movement of the mobile station based at least in part upon prior history of movement of the mobile station.

* * * * *